(12) United States Patent
Shiota et al.

(10) Patent No.: US 11,122,167 B2
(45) Date of Patent: Sep. 14, 2021

(54) IMAGE READING APPARATUS, STORAGE MEDIUM STORING ABNORMALITY DETERMINATION PROGRAM, AND ABNORMALITY DETERMINATION METHOD

(71) Applicant: SEIKO EPSON CORPORATION, Tokyo (JP)

(72) Inventors: Takayuki Shiota, Kitakyushu (JP); Ryoichi Hirayama, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/998,250

(22) Filed: Aug. 20, 2020

(65) Prior Publication Data

US 2021/0058519 A1 Feb. 25, 2021

(30) Foreign Application Priority Data

Aug. 22, 2019 (JP) .............................. JP2019-152095

(51) Int. Cl.
*H04N 1/04* (2006.01)
*H04N 1/00* (2006.01)
*H04N 1/32* (2006.01)

(52) U.S. Cl.
CPC ..... *H04N 1/00037* (2013.01); *H04N 1/00018* (2013.01); *H04N 1/0071* (2013.01); *H04N 1/00639* (2013.01); *H04N 1/00748* (2013.01); *H04N 1/3263* (2013.01)

(58) Field of Classification Search
CPC ........... H04N 1/00037; H04N 1/00681; H04N 1/0071; H04N 1/047; H04N 1/00718; H04N 1/00769; H04N 1/00777; H04N 2201/04753; H04N 2201/04796; H04N 1/04
USPC ...................... 358/1.12, 1.15, 498, 496, 488
See application file for complete search history.

(56) References Cited

U.S. PATENT DOCUMENTS

| | | | |
|---|---|---|---|
| 2019/0112139 A1* | 4/2019 | Hirayama | B65H 7/02 |
| 2019/0349493 A1* | 11/2019 | Shiota | H04N 1/0074 |
| 2020/0145547 A1* | 5/2020 | Kitsuki | H04N 1/00777 |
| 2020/0172357 A1* | 6/2020 | Arimori | B65H 7/06 |
| 2020/0377319 A1* | 12/2020 | Eguchi | B65H 1/02 |

FOREIGN PATENT DOCUMENTS

| | | | |
|---|---|---|---|
| JP | 2012076902 A | * | 4/2012 |
| JP | 2016-001795 A | | 1/2016 |

* cited by examiner

*Primary Examiner* — Cheukfan Lee
(74) *Attorney, Agent, or Firm* — Workman Nydegger

(57) ABSTRACT

A control unit of an image reading apparatus acquires, at an upstream position in a medium transportation direction of an abnormality determination area set for a leading-edge area of a medium, a distance WL from a center position in a medium width direction intersecting with the medium transportation direction to one edge in the medium width direction and a distance WR from the center position to the other edge in the medium width direction, and compares a value R that is a ratio between the distance WL and the distance WR or a difference therebetween with a threshold R0 determined in advance.

8 Claims, 18 Drawing Sheets

IMAGE READING APPARATUS, STORAGE MEDIUM STORING ABNORMALITY DETERMINATION PROGRAM, AND ABNORMALITY DETERMINATION METHOD

The present application is based on, and claims priority from JP Application Serial Number 2019-152095, filed Aug. 22, 2019, the disclosure of which is hereby incorporated by reference herein in its entirety.

BACKGROUND

1. Technical Field

Embodiments of the present disclosure relate to an image reading apparatus that reads an image of a document. The embodiments relate also to a non-transitory computer-readable storage medium storing an abnormality determination program to be run on the image reading apparatus, and to an abnormality determination method.

2. Related Art

Some scanners as an example of an image reading apparatus are sheet-feed-type scanners configured to read an image of a document while transporting the document. In such sheet-feed-type scanners, a technique of detecting skew of a document and performing predetermined processing has been used in related art. As disclosed in JP-A-2016-001795, many scanners of related art read an image of a leading-edge area of a document, calculates an inclination of an edge of the document, and rotates the acquired image based on the result of calculation, or stops the transportation of the document as abnormal transportation status if the degree of the skew is significant.

In scanners, stapled sheets of a document are sometimes set on a feeder tray, and feeding is started without removal of the staple before it. If the transportation of the document continues in such a stapled state, the document will be significantly damaged. In the following description, abnormal status that occurs for this reason is referred to as "staple abnormality".

In such staple abnormality, the amount of inclination of the leading edge of the document is sometimes small. For this reason, if abnormal transportation status is determined based on the inclination of the leading edge of the document as done in scanners of related art, it might be impossible to detect the abnormality and, therefore, there is a risk of significant damage to the document due to failing to stop the transportation of the document.

SUMMARY

An image reading apparatus according to a certain aspect of the present disclosure includes: a medium transportation path along which a medium is transported; a read unit that reads the medium and is provided on the medium transportation path; and a control unit that processes read data read by the read unit and controls transportation of the medium along the medium transportation path; wherein the control unit sets an abnormality determination area for a leading-edge area of the medium and performs abnormality determination processing for the abnormality determination area, the abnormality determination processing includes first determination processing; and the first determination processing includes acquiring, at an upstream position in a medium transportation direction of the abnormality determination area, a distance WL from a center position in a medium width direction intersecting with the medium transportation direction to one edge in the medium width direction and a distance WR from the center position to the other edge in the medium width direction, and comparing a value R that is a ratio between the distance WL and the distance WR or a difference therebetween with a threshold R0 determined in advance.

DESCRIPTION OF EXEMPLARY EMBODIMENTS

Figure 1:
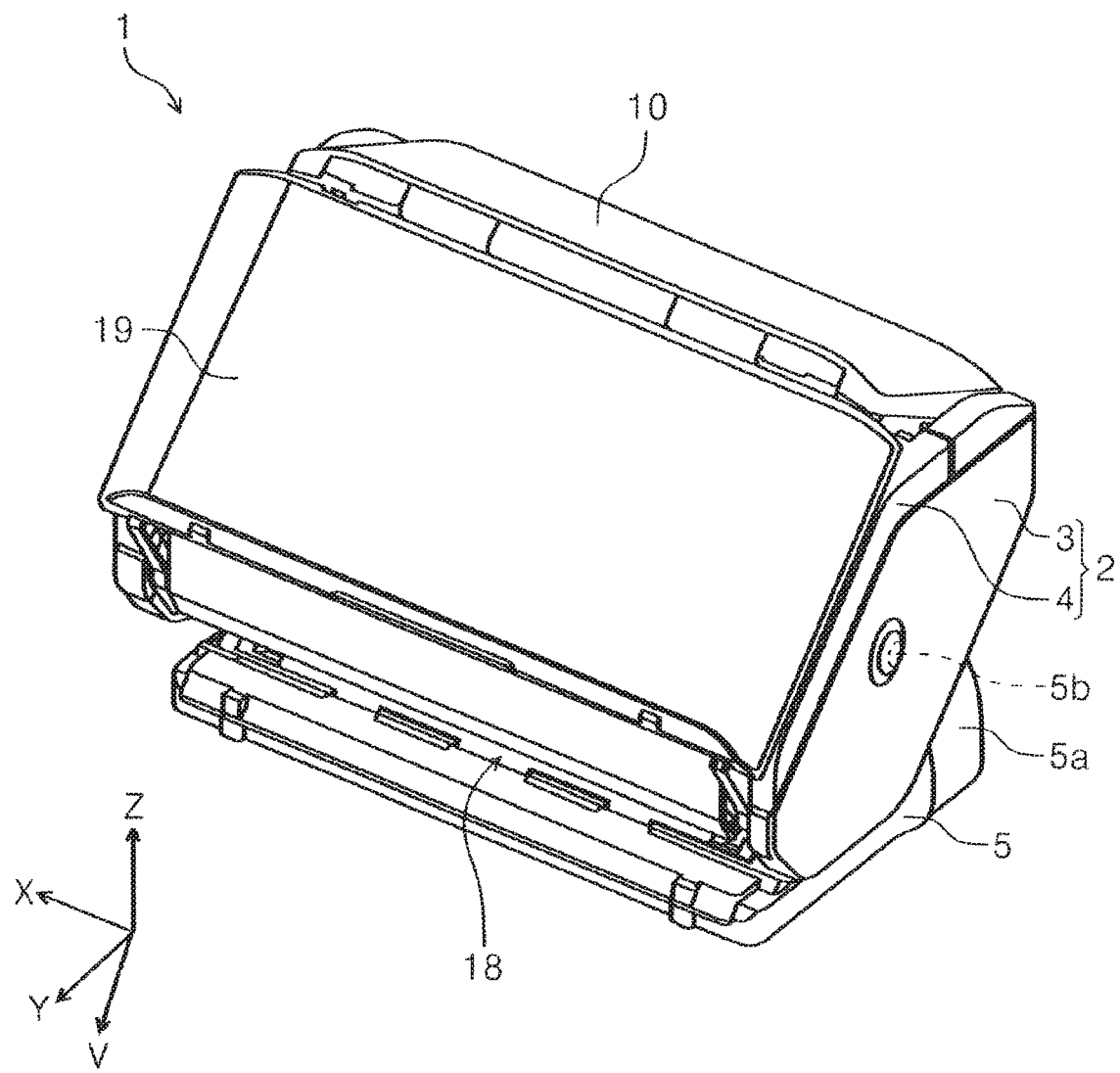
FIG. 1 is an external perspective view of a scanner.

The following is an overview of the present disclosure.
An image reading apparatus according to a first aspect of the present disclosure includes: a medium transportation path along which a medium is transported; a read unit that reads the medium and is provided on the medium transportation path; and a control unit that processes read data read by the read unit and controls transportation of the medium along the medium transportation path; wherein the control unit sets an abnormality determination area for a leading-edge area of the medium and performs abnormality determination processing for the abnormality determination area, the abnormality determination processing includes first determination processing; and the first determination processing includes acquiring, at an upstream position in a medium transportation direction of the abnormality determination area, a distance WL from a center position in a medium width direction intersecting with the medium transportation direction to one edge in the medium width direction and a distance WR from the center position to the other edge in the medium width direction, and comparing a value R that is a ratio between the distance WL and the distance WR or a difference therebetween with a threshold R0 determined in advance.

If feeding of sheets of a medium bound with a staple or the like is started without unbinding, more specifically, if feeding of sheets of a medium stapled at a downstream corner in the transportation direction is started without removal of the staple before it, a bent corner will be formed at the leading edge of the medium. Therefore, in a read image obtained by reading the leading-edge area of the medium, the portion corresponding to the bent corner at the leading edge of the medium will be missing. Consequently, the position of the read image in the medium width direction tends to be biased either to the left or to the right. Such bending of a corner at the leading edge of a document will be described below using a set of phrases "a bent corner at the leading edge".

In this aspect, at an upstream position in a medium transportation direction of the abnormality determination area, a distance WL from a center position in a medium width direction intersecting with the medium transportation direction to one edge in the medium width direction and a distance WR from the center position to the other edge in the medium width direction are acquired, and a value R that is a ratio between the distance WL and the distance WR or a difference therebetween is compared with a threshold R0 determined in advance, thereby evaluating the biasing of the read image in the medium width direction to the left or to the right. By this means, it is possible to detect staple abnormality and prevent or reduce damage to the medium.

The terms "one edge" and "the other edge" do not necessarily mean the pair of edges in the width direction of the medium. The following case is also encompassed: the edge is detected at the upstream position in the medium transportation direction of the abnormality determination area, and either one is the leading edge of the medium due to skew or a bent corner at the leading edge of the medium.

A second aspect is that, in the first aspect, in the first determination processing, the control unit calculates the value R using an equation R=WL/WR when the distance WR is longer than the distance WL, calculates the value R using an equation R=WR/WL when the distance WL is longer than the distance WR, and sets the value R as R=1 when the distance WR is equal to the distance WL, and the control unit compares the value R with the threshold R0 that is less than 1, and determines as abnormality and performs predetermined processing when the value R is less than the threshold R0.

In this aspect, since the value R is calculated using the ratio between the distance WR and the distance WL, it is less susceptible to the effect of medium size, and it is possible to detect staple abnormality well.

A third aspect is that, in the second aspect, the abnormality determination processing includes second determination processing that is performed as the predetermined processing when the value R is less than the threshold R0 in the first determination processing, the second determination processing includes acquiring, along the medium transportation direction, a plurality of document widths in the medium width direction in the abnormality determination area, acquiring a value d that is a difference between a maximum value and a minimum value of the plurality of document widths acquired, and comparing the value d with a threshold dw determined in advance, and the control unit stops the transportation of the medium when the value d is equal to or greater than the threshold dw.

The horizontal biasing of the read image in the medium width direction occurs not only when the medium has a bent corner at its leading edge but also when, for example, a medium having small size is set at a position shifted from the center position in the medium width direction and is fed. In such a case, unlike a medium having a bent corner at its leading edge, there is almost no incremental change in the width of the medium along the medium transportation direction.

This aspect uses the above nature and includes acquiring a value d that is a difference between a maximum value and a minimum value of the plurality of document widths acquired, and comparing the value d with a threshold dw determined in advance, and the control unit stops the transportation of the medium by recognizing that the medium has a bent corner at its leading edge when the value d is equal to or greater than the threshold dw. Therefore, it is possible to detect staple abnormality more accurately.

A fourth aspect is that, in the third aspect, the abnormality determination processing includes third determination processing that is performed when the value d is less than the threshold dw in the second determination processing, the third determination processing includes acquiring an inclination angle $\theta$ of a leading edge of the medium in the abnormality determination area, and comparing the inclination angle $\theta$ with a threshold $\theta 0$ determined in advance, and the control unit stops the transportation of the medium when the inclination angle $\theta$ is equal to or greater than the threshold $\theta 0$.

In this aspect, since the transportation of the medium is stopped when the inclination angle $\theta$ of the leading edge of the medium is equal to or greater than the threshold $\theta 0$ determined in advance, it is possible to prevent the medium from being significantly damaged or prevent the occurrence of a jam due to the transportation of the medium with a significant degree of skew.

A fifth aspect is that, in the first aspect, the control unit acquires a position of a first edge that is one edge in the medium width direction and a position of a second edge that is the other edge in the medium width direction, based on one end position and the other end position in the medium width direction of a third edge that is a downstream edge in the medium transportation direction.

In many cases, the light source of the read unit applies light from upstream to downstream or from downstream to upstream in the medium transportation direction. For this reason, although it is easier to obtain contrast at the upstream edge or the downstream edge in the medium transportation direction and thus easier to perform edge extraction thereat, it is sometimes difficult to obtain contrast at the edge in the medium width direction and thus difficult to perform edge extraction thereat. This is especially true when the sheet is thin and it is therefore difficult to obtain contrast against the background. Consequently, the distances WL and WR described above might not be acquired accurately.

In this aspect, the position of the first edge and the position of the second edge are acquired based on one end position and the other end position in the medium width direction of the third edge that is the downstream edge in the medium transportation direction. Therefore, it is possible to acquire the distances WL and WR more reliably without a significant error.

The image reading apparatus of the sixth aspect further includes, in addition to those of the first aspect: a sensor provided upstream of the read unit on the medium transportation path, the sensor being configured to be in contact with a leading edge of the medium and detect passing of the leading edge; wherein the abnormality determination processing includes jam determination processing for determining whether the medium is deformed or not, in the jam determination processing, on a reading line at timing of determining that the leading edge of the medium reaches a reading position by the read unit, when the medium is determined to be absent at a position where the sensor is provided in the medium width direction, a search is performed in one direction and the other direction of the medium width direction to check whether the medium is present or not, and the transportation of the medium is stopped when the medium is found in both of the one direction and the other direction of the medium width direction or when the medium is found neither in the one direction nor in the other direction of the medium width direction.

When a sensor configured to be in contact with a leading edge of a medium and detect passing of the leading edge is provided upstream of the read unit on the medium transportation path, there are the following possibilities, especially if the medium is thin and has low stiffness: the leading edge deforms and thus cannot pass through the position of the sensor, and only a remote portion of the leading edge away from the position of the sensor travels downstream in the transportation direction, or the entire leading edge of the medium throughout the width direction fail to reach the sensor. If the transportation is continued without detecting such a transportation failure, there is a risk of significant damage to the medium.

In this aspect, on a reading line at timing of determining that the leading edge of the medium reaches a reading position by the read unit, when the medium is determined to be absent at a position where the sensor is provided in the medium width direction, a search is performed in one direction and the other direction of the medium width direction to check whether the medium is present or not, and the transportation of the medium is stopped when the medium is found in both of the one direction and the other direction of the medium width direction or when the medium is found neither in the one direction nor in the other direction of the medium width direction. Therefore, it is possible to detect the occurrence of the transportation failure described above properly and prevent the medium from being significantly damaged.

A non-transitory computer-readable storage medium according to a seventh aspect of the present disclosure is a storage medium storing an abnormality determination program to be run on an image reading apparatus, the image reading apparatus including a medium transportation path along which a medium is transported, a read unit that reads the medium and is provided on the medium transportation path, and a control unit that processes read data read by the read unit and controls transportation of the medium along the medium transportation path, the abnormality determination program comprising: first determination processing of setting an abnormality determination area for a leading-edge area of the medium and performing abnormality determination for the abnormality determination area; wherein the first determination processing includes acquiring, at an upstream position in a medium transportation direction of the abnormality determination area, a distance WL from a center position in a medium width direction intersecting with the medium transportation direction to one edge in the medium width direction and a distance WR from the center position to the other edge in the medium width direction, and comparing a value R that is a ratio between the distance WL and the distance WR or a difference therebetween with a threshold R0 determined in advance.

In this aspect, similarly to the first aspect described above, at an upstream position in a medium transportation direction of the abnormality determination area, a distance WL from a center position in a medium width direction intersecting with the medium transportation direction to one edge in the medium width direction and a distance WR from the center position to the other edge in the medium width direction are acquired, and a value R that is a ratio between the distance WL and the distance WR or a difference therebetween is compared with a threshold R0 determined in advance, thereby evaluating the biasing of the read image in the medium width direction to the left or to the right. Therefore, it is possible to detect staple abnormality and prevent or reduce damage to the medium.

An abnormality determination method according to an eighth aspect of the present disclosure is a method implemented in an image reading apparatus, the image reading apparatus including a medium transportation path along which a medium is transported, a read unit that reads the medium and is provided on the medium transportation path, and a control unit that processes read data read by the read unit and controls transportation of the medium along the medium transportation path, the abnormality determination method comprising: acquiring, at an upstream position in a medium transportation direction of an abnormality determination area set for a leading-edge area of the medium, a distance WL from a center position in a medium width direction intersecting with the medium transportation direction to one edge in the medium width direction and a distance WR from the center position to the other edge in the medium width direction; and comparing a value R that is a ratio between the distance WL and the distance WR or a difference therebetween with a threshold R0 determined in advance.

In this aspect, similarly to the first aspect described above, at an upstream position in a medium transportation direction of the abnormality determination area, a distance WL from a center position in a medium width direction intersecting with the medium transportation direction to one edge in the medium width direction and a distance WR from the center position to the other edge in the medium width direction are acquired, and a value R that is a ratio between the distance WL and the distance WR or a difference therebetween is compared with a threshold R0 determined in advance, thereby evaluating the biasing of the read image in the medium width direction to the left or to the right. Therefore, it is possible to detect staple abnormality and prevent or reduce damage to the medium.

Next, embodiments of the present disclosure will now be explained with specific examples. In the description below, a scanner 1 capable of reading at least one of the front and back of a sheet of a document is taken as an example of an image reading apparatus. The scanner 1 is a so-called document scanner that performs reading while moving a document across a read unit.

In the X-Y-Z coordinate system depicted in each figure, the X-axis direction represents the width direction of the apparatus, meaning the width direction of a document. The Y-axis direction represents the depth direction of the apparatus, which is along the horizontal direction. The Z-axis direction is along the vertical direction. The V-axis direction is parallel to a document transportation path T, which will be described later. In the figures, the Y axis is not illustrated except where necessary. In the present embodiment, the direction from the rear toward the front of the apparatus is defined as the +Y direction, and the direction from the front toward the rear of the apparatus is defined as the −Y direction. Facing the front of the apparatus, the direction toward the left is defined as the +X direction, and the direction toward the right is defined as the −X direction. In the description below, the direction in which a document is transported (the +V direction) is sometimes described as "downstream", and the opposite direction (the −V direction) is sometimes described as "upstream".

Figure 2:
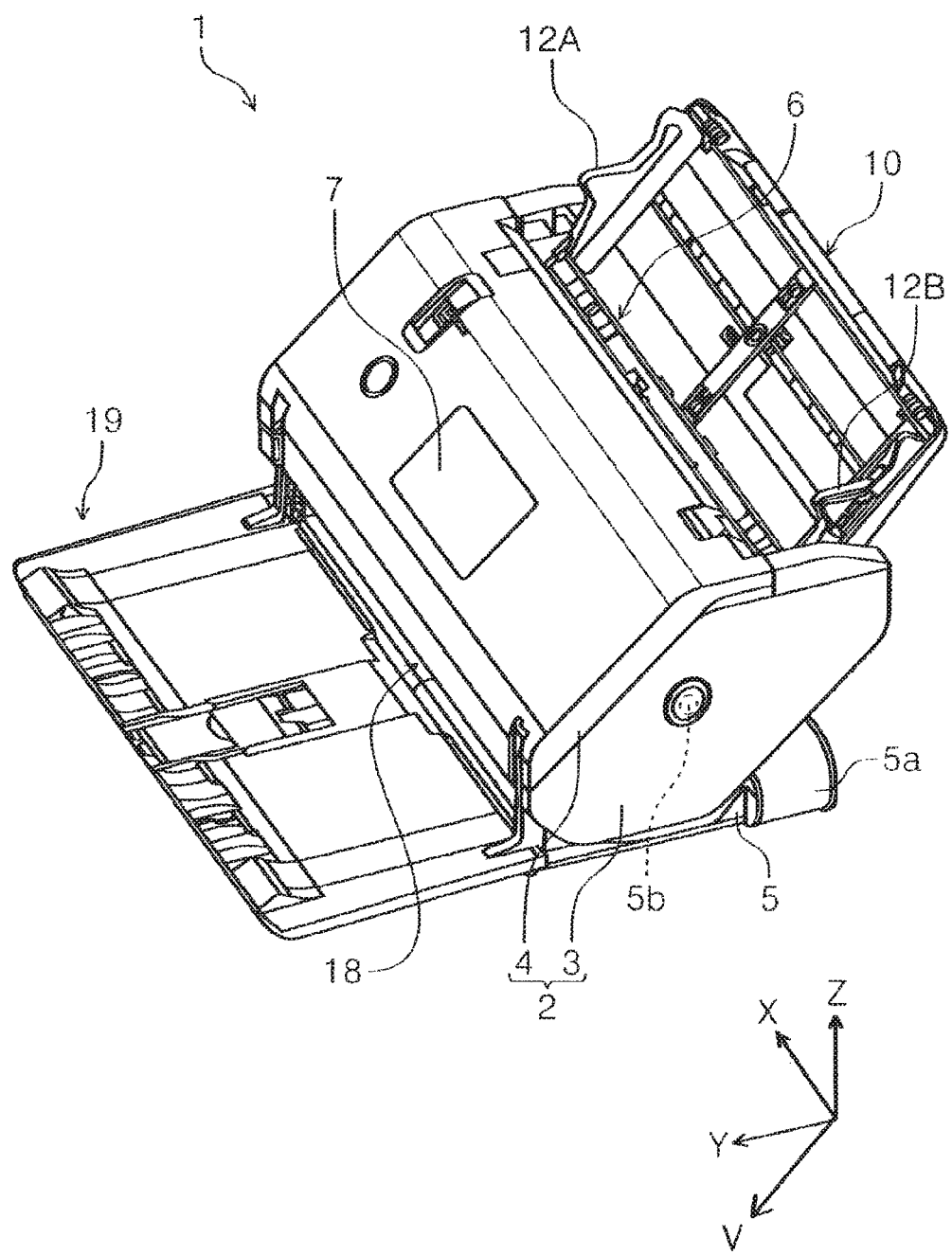
FIG. 2 is an external perspective view of the scanner.
Figure 3:
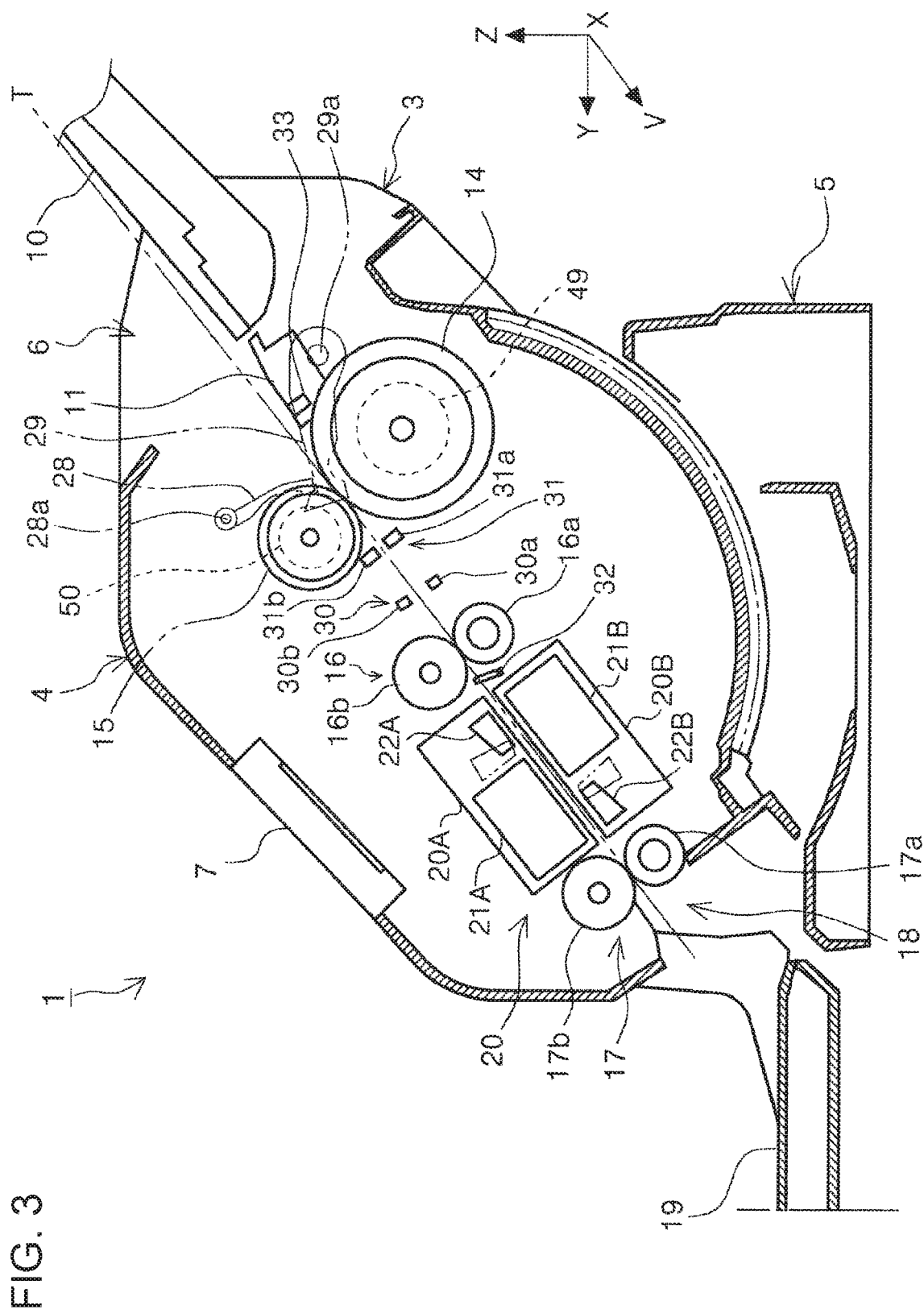
FIG. 3 is a side sectional view of a document transportation path of the scanner.

In FIGS. 1, 2, and 3, the scanner 1 includes a scanner body 2 and a pedestal 5. The pedestal 5 supports the scanner body 2 rotatably. The scanner body 2 includes a lower unit 3 and an upper unit 4. A user can open and close the upper unit 4 by rotating it on a non-illustrated pivot shaft away from and toward the lower unit 3. Opening the upper unit 4 frontward exposes the document transportation path described later.

The lower unit 3 of the scanner body 2 is provided rotatably around a rotation shaft 5b with respect to an arm portion 5a of the pedestal 5 such that, by rotation, its positional state is changeable. The body 2 of the scanner 1 according to the present embodiment is able to be kept at three positions by a non-illustrated position keeper, specifically, a first position in which the document transportation path T (see FIG. 3) is closest to perpendicular orientation, a third position in which the document transportation path T is closest to horizontal orientation, and a second position that is between the first position and the third position. FIGS. 1, 2, and 3 depict that the scanner body 2 is in the second positional state. The second position and the third position are positions taken when a document is read. The first position is a position taken when not in use.

The upper unit 4 includes a front cover 19. The lower unit 3 includes a top cover 10. The front cover 19 is provided rotatably on the upper unit 4. By rotation, the front cover 19 can be closed as illustrated in FIG. 1 and opened as illustrated in FIG. 2. The opened front cover 19 serves as a document receiver tray configured to receive each sheet of a document ejected after reading as illustrated in FIGS. 2 and 3.

On its top face, the upper unit 4 includes an operation panel 7 that offers a user interface (UI) for various kinds of operation such as read setting and read execution and for display of the content of the read setting, etc. as illustrated in FIG. 2. In the present embodiment, the operation panel 7 is a so-called touch panel that has both display and input capabilities, that is, dual functions as an operation interface that accepts various kinds of operation and as a display interface that displays various kinds of information. The operation panel 7 appears when the front cover 19 is opened.

The top cover 10 provided on the lower unit 3 can be rotated in relation to the lower unit 3. By rotation, the top cover 10 can be closed as illustrated in FIG. 1 and opened as illustrated in FIGS. 2 and 3. The opened top cover 10 serves as a document supporting tray configured to support sheets of a document to be fed as illustrated in FIGS. 2 and 3. A feed opening 6 for communication into the scanner body 2 is provided at the top of the scanner body 2. A document placed on the top cover 10 is fed through the feed opening 6 to the inside of the scanner body 2.

In FIG. 2, the reference numerals 12A and 12B denote a pair of edge guides configured to guide the X directional edges of a document. When one of the edge guides 12A and 12B is operated, they move closer to each other or away from each other due to a function of a non-illustrated rack pinion mechanism.

Next, mainly with reference to FIG. 3, the document transportation path T in the scanner 1 will now be explained. The document transportation path T illustrated in FIG. 3 is a path taken when the scanner body 2 is in the second positional state described above. The document transportation path T is a linear path formed between the lower unit 3 and the upper unit 4. When the scanner body 2 is in the second positional state described above, the document transportation path T extends obliquely downward from upstream to downstream.

The top cover 10 described above is provided at the most upstream end of the document transportation path T. A path forming member 11 is provided downstream of the top cover 10. Also provided downstream of the top cover 10 are a feed roller 14 configured to feed the placed document downstream and a separation roller 15 configured to co-operate with the feed roller 14 so as to nip the document therebetween for sheet separation. The feed roller 14 is in contact with the lower surface of the bottom one of sheets (document) stacked on the top cover 10. When there are sheets stacked on the top cover 10, the sheets are therefore fed sequentially downstream, the bottom one first. The lower surface of the stack of the sheets on the top cover 10 is a first side facing the top cover 10. The opposite surface is a second side. The feed roller 14 is configured to be in contact with the first side of the document. The separation roller 15 is configured to be in contact with the second side of the document.

Figure 5:
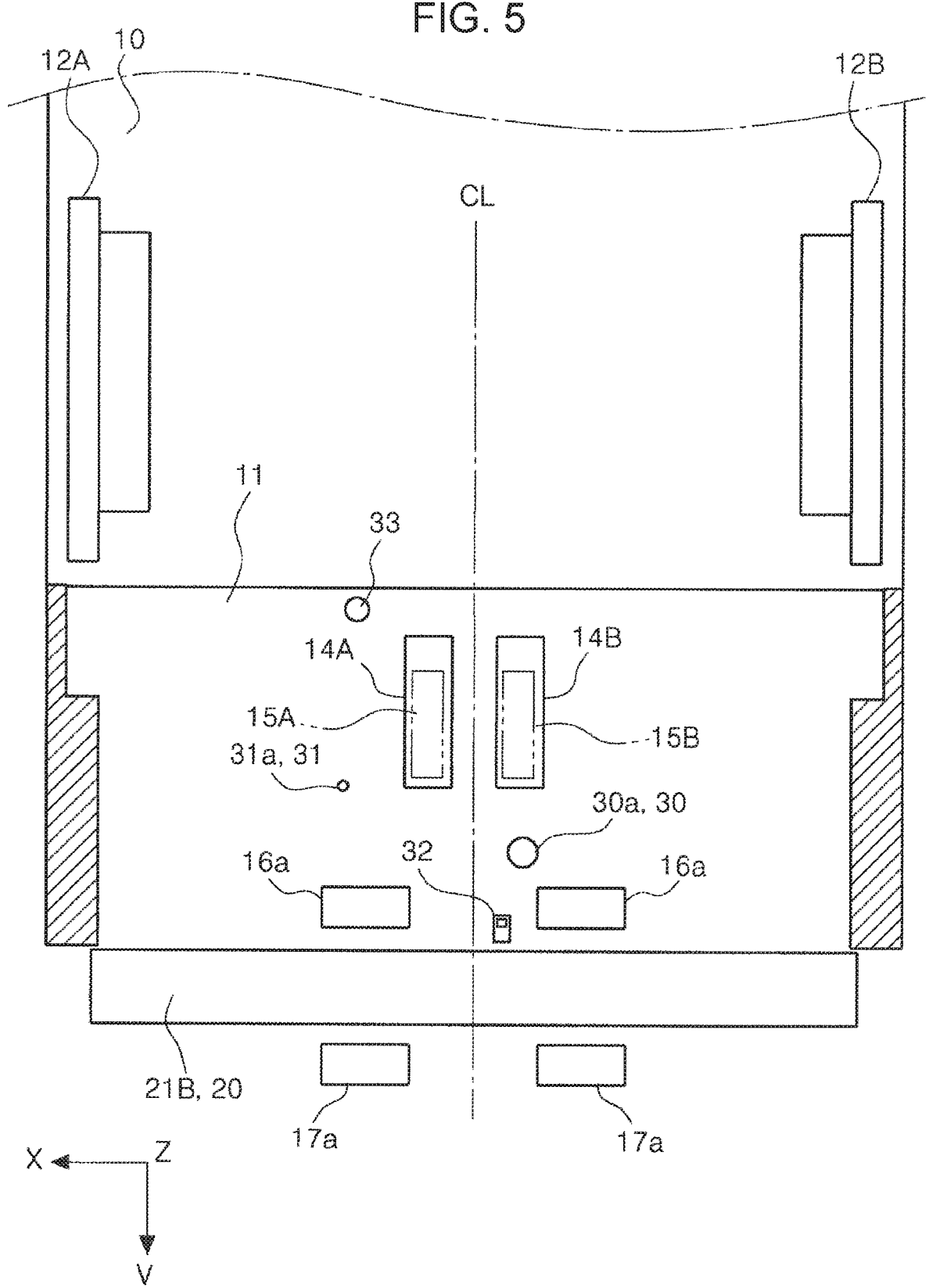
FIG. 5 is a plan view of the document transportation path of the scanner.

In the present embodiment, as illustrated in FIG. 5, left and right parts that constitute the feed roller 14 are arranged symmetrically with respect to the center position CL in the document width direction. In FIG. 5, the left part of the feed roller 14 with respect to the center position CL is denoted as 14A, and the right part of the feed roller 14 with respect to the center position CL is denoted as 14B. Similarly, the separation roller 15 consists of a left separation roller part 15A and a right separation roller part 15B with respect to the center position CL. That is, in the present embodiment, the center position CL in the document width direction is the baseline position for feeding a document. Therefore, in the present embodiment, the center position CL does not vary no matter which size the document may have.

Referring back to FIG. 3, the feed roller 14 receives rotational torque from a feed roller motor 45 (see FIG. 4) through a one-way clutch 49. Receiving the rotational torque, the feed roller 14 rotates counterclockwise in FIG. 3. Rotational torque acting for counterclockwise rotation in FIG. 3 is transmitted from a separation roller motor 51 (see FIG. 4) to the separation roller 15 through a torque limiter 50.

Due to counterclockwise rotation in FIG. 3, the feed roller 14 feeds the document downstream. Since the one-way clutch 49 is provided on a drive power transmission path between the feed roller 14 and the feed roller motor 45 (see FIG. 4), even if the feed roller motor 45 rotates in the reverse direction, the feed roller 14 does not rotate in the reverse direction. When the feed roller motor 45 is in a stopped state, the feed roller 14 is able to rotate passively in the forward direction due to contact with the document that is being transported. For example, upon detection of the leading edge of the document by a second document detection unit 32 provided downstream of a pair of transportation rollers 16, a controlling unit 40 (see FIG. 4) stops the drive operation of the feed roller motor 45 (see FIG. 4) and drives a transportation roller motor 46 (see FIG. 4) only. As a result, the document is transmitted by the pair of transportation rollers 16, and the feed roller 14 rotates passively in the forward direction due to contact with the document that is being transported.

Next, if there is no sheet between the feed roller 14 and the separation roller 15 or if there is one sheet only therebetween, the magnitude of rotational torque acting for rotating the separation roller 15 in the forward direction is in excess of limit torque that is the upper torque limit value and, therefore, slipping occurs at the torque limiter 50. As a result, the separation roller 15 rotates passively in the forward direction despite the rotational torque received from the separation roller motor 51 (see FIG. 4), meaning idle rotation. During document feed operation, basically, the separation roller motor 51 is rotating in the reverse direction, that is, is generating rotational torque for rotation of the separation roller 15.

Next, if the second sheet or more goes into the nip between the feed roller 14 and the separation roller 15 in addition to the sheet of the document that should be fed, slipping occurs between the sheets. Driven by the drive torque received from the separation roller motor 51, therefore, the separation roller 15 rotates in the reverse direction. As a result, the multiple-fed second sheet or more is returned upstream, meaning that multiple feeding is prevented because of this reverse rotation.

Next, the member denoted as 28 in FIG. 3, a flap, will now be explained. The flap 28 prevents the contact of the document set on the top cover 10 with the separation roller 15 before feeding is started. The flap 28 is able to rotate on a rotation shaft 28*a*. Before feeding is started, the lower end of the flap 28 is in engagement with a set guide 29 so as not to rotate in the clockwise direction in FIG. 3. Upon the start of feeding, the set guide 29 rotates on a rotation shaft 29*a* in the counterclockwise direction in FIG. 3. This makes the flap 28 rotatable. Accordingly, the leading edge of the stack of the sheets of the document on the top cover 10 comes into contact with the separation roller 15.

The pair of transportation rollers 16, a reading device 20 that is an example of a read unit that acquires a document image by reading, and a pair of ejection rollers 17 are provided downstream of the feed roller 14. The transportation roller pair 16 is made up of a transportation driving roller 16*a* and a transportation driven roller 16*b*. The transportation driving roller 16*a* rotates by receiving drive power applied by the transportation roller motor 46 (see FIG. 4). The transportation driven roller 16*b* rotates passively as a slave. The document fed downstream while being nipped between the feed roller 14 and the separation roller 15 is nipped by the pair of transportation rollers 16 and is thereafter transported to a position facing an upper sensor unit 20A and a lower sensor unit 20B, which are provided downstream of the pair of transportation rollers 16.

The reading device 20 includes the upper sensor unit 20A, which is located above the document transportation path T and is provided in the upper unit 4, and the lower sensor unit 20B, which is located below the document transportation path T and is provided in the lower unit 3. The upper sensor unit 20A includes a sensor module 21A. The lower sensor unit 20B includes a sensor module 21B. In the present embodiment, the sensor module 21A, 21B is a contact-type image sensor module (CISM). The sensor module 21A, which is located above the document transportation path T, reads the second side, which is the upper surface of the document. The sensor module 21B, which is located below the document transportation path T, reads the first side, which is the lower surface of the document. A document scan plane for reading by the upper sensor unit 20A is parallel to the document transportation path T. A document scan plane for reading by the lower sensor unit 20B is also parallel to the document transportation path T.

The upper sensor unit 20A includes a background plate 22A provided at a position facing the sensor module 21B of the lower sensor unit 20B. The lower sensor unit 20B includes a background plate 22B provided at a position facing the sensor module 21A of the upper sensor unit 20A. The background plate 22A, 22B is a reference plate to be read by the opposite sensor module for the purpose of shading compensation. For example, a white, gray, or black resin plate, a metal plate painted in white, gray, or black, or the like can be used as the reference plate to be read.

The background plate 22A, 22B is able to rotate by receiving drive power applied by a motor that is not illustrated. By rotation, the background plate 22A, 22B is switchable between a facing state, which is a state of facing with the opposite sensor module as indicated by solid line illustration, and a non-facing state, which is a state of not facing with the opposite sensor module as indicated by two-dot chain line illustration. For example, if the background plate 22A, 22B is a white plate, it is possible to acquire a white reference value when in the facing state, and it is possible to acquire a black reference value when in the non-facing state.

After reading of an image of at least one of the first side and the second side of the document at the reading device 20, the document is nipped by the pair of ejection rollers 17 located downstream of the reading device 20 and is thereafter ejected through an ejection port 18. The ejection roller pair 17 is made up of an ejection driving roller 17*a* and an ejection driven roller 17*b*. The ejection driving roller 17*a* rotates by receiving drive power applied by the transportation roller motor 46 (see FIG. 4). The ejection driven roller 17*b* rotates passively as a slave.

Figure 4:
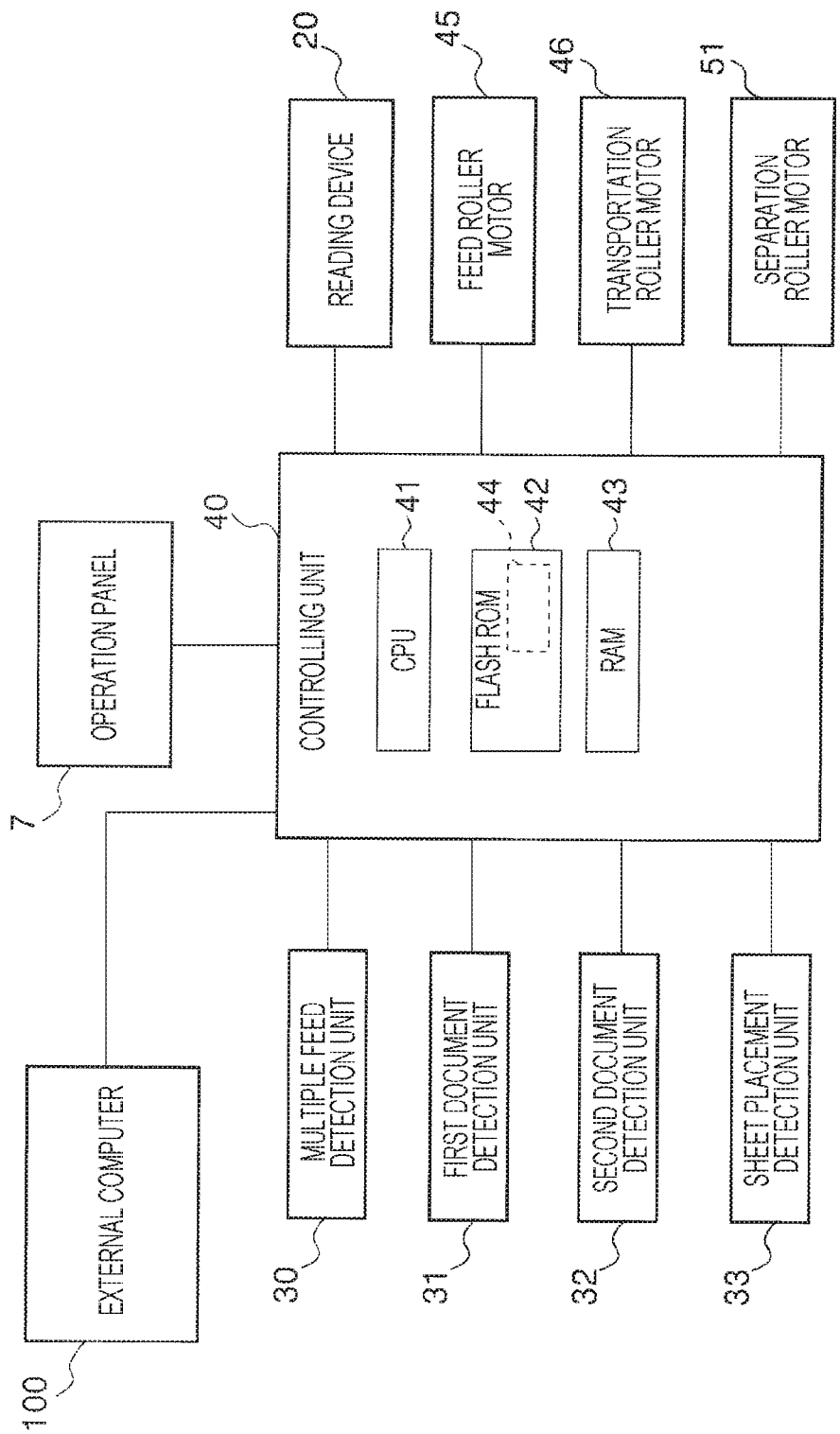
FIG. 4 is a block diagram of a control system of the scanner.

Next, with reference to FIG. 4, a control system of the scanner 1 will now be explained. FIG. 4 is a block diagram that illustrates the control system of the scanner 1 according to the present disclosure. In FIG. 4, the controlling unit 40 that is an example of a control unit performs various kinds of control on the scanner 1, including document feed control, document transport control, document eject control, document read control, and others. Signals from the operation panel 7 are inputted into the controlling unit 40.

The controlling unit 40 controls the feed roller motor 45, the transportation roller motor 46, and the separation roller motor 51. In the present embodiment, each of these motors is a DC motor. Read data is inputted into the controlling unit 40 from the reading device 20. Signals for controlling the reading device 20 are transmitted from the controlling unit 40 to the reading device 20. Signals from detection units described later, for example, a multiple feed detection unit 30, a first document detection unit 31, and a second document detection unit 32, and others, are also inputted into the controlling unit 40. In addition, detection values of an encoder configured to detect the amount of rotation of the feed roller motor 45 and an encoder configured to detect the amount of rotation of the transportation driving roller 16*a* and the ejection driving roller 17*a* are also inputted into the controlling unit 40. With these inputs, the controlling unit 40 is able to detect the amount of feeding and transporting the document by the rollers.

The controlling unit 40 includes a CPU 41, a flash ROM 42, and a RAM 43. In accordance with a program 44 stored in the flash ROM 42, the CPU 41 performs various kinds of arithmetic processing to control the entire operation of the scanner 1. The flash ROM 42 is a readable-and-writable nonvolatile memory. Data that is necessary for abnormality determination described later, etc. is also stored in the flash ROM 42. In this specification, unless otherwise specified, all of data that is necessary for abnormality determination described later, parameters that are necessary for control, and the like, are stored in the flash ROM 42. The stored values are updated by the controlling unit 40 as needed. Various kinds of setting information inputted by a user via the operation panel 7 are also stored in the flash ROM 42. The program 44 stored in the flash ROM 42 does not necessarily mean a single program. The program 44 stored in the flash ROM 42 may consist of a plurality of programs, including a program for determining abnormality on the document transportation path T, and various kinds of control program needed for transporting and reading the document P, and the like. The RAM 43 is a volatile memory. The RAM 43 is used as a workspace, etc. for the CPU 41.

The scanner 1 is able to be connected to an external computer 100. Information is inputted from the external computer 100 into the controlling unit 40. The external computer 100 is provided with a non-illustrated display. On the display, a user interface (UI) is presented by a control program stored in a non-illustrated storage of the external computer 100.

Next, various detection units will now be explained. A sheet placement detection unit 33 is one of them. The sheet placement detection unit 33 is a detection unit provided on the path forming member 11 (see FIG. 3). Based on a signal transmitted from the sheet placement detection unit 33, the controlling unit 40 is able to detect whether there is a document on the top cover 10 or not. The first document detection unit 31 is a detection unit provided downstream of the feed roller 14 (see FIG. 3). An example of the first document detection unit 31 is an optical sensor. The first document detection unit 31 configured as an optical sensor includes a light emitter 31*a* and a light receiver 31*b* that face each other, with the document transportation path T extending therebetween as illustrated in FIG. 3. The light receiver 31*b* transmits an electric signal that indicates the intensity of detected light to the controlling unit 40. The document that is being transported blocks light emitted from the light emitter 31*a*. The optical blocking causes a change in the electric signal that indicates the intensity of the detected light. Based on the change, the controlling unit 40 is able to detect the passing of the leading edge or the trailing edge of the sheet of the document.

The multiple feed detection unit 30 configured to detect the multiple feeding of sheets of the document is provided downstream of the first document detection unit 31. The multiple feed detection unit 30 includes an ultrasonic transmitter 30*a* and an ultrasonic receiver 30*b* that face each other, with the document transportation path T extending therebetween as illustrated in FIG. 3. The ultrasonic receiver 30*b*, which receives an ultrasonic wave, transmits an output value corresponding to detected ultrasonic wave intensity to the controlling unit 40. An electric signal that indicates the ultrasonic intensity changes if multiple feeding of sheets of the document occurs. Based on the change, the controlling unit 40 is able to detect the multiple feeding of sheets of the document.

The second document detection unit 32 is provided downstream of the multiple feed detection unit 30 and further downstream of the pair of transportation rollers 16. The second document detection unit 32 is configured as a contact-type sensor that includes a lever. The lever turns when the leading edge or the trailing edge of the sheet of the document passes. The turning of the lever causes a change in an electric signal sent from the second document detection unit 32 to the controlling unit 40. Based on the change, the controlling unit 40 is able to detect the passing of the leading edge or the trailing edge of the sheet of the document. The controlling unit 40 is able to know the position of the sheet of the document P on the document transportation path T by means of the first document detection unit 31 and the second document detection unit 32 described above.

Next, abnormality determination processing will now be explained. In the following description, a bent corner at the leading edge of a document is taken as an example of abnormal transportation status. Skew is taken as another example. Abnormality determination processing described below is processing for detecting the occurrence of a bent corner at the leading edge of a document, or skew. First, with reference to FIGS. 6 and 7, a bent corner at the leading edge of a document will now be explained with a specific example. P1 denotes the bottom sheet fed in contact with the feed roller 14. P2 denotes a sheet that is on this bottom one. P1*f* denotes the downstream edge of the sheet P1 in the transportation direction, that is, its leading edge. P2*f* denotes the downstream edge of the sheet P2 in the transportation direction, that is, its leading edge.

Figure 6:
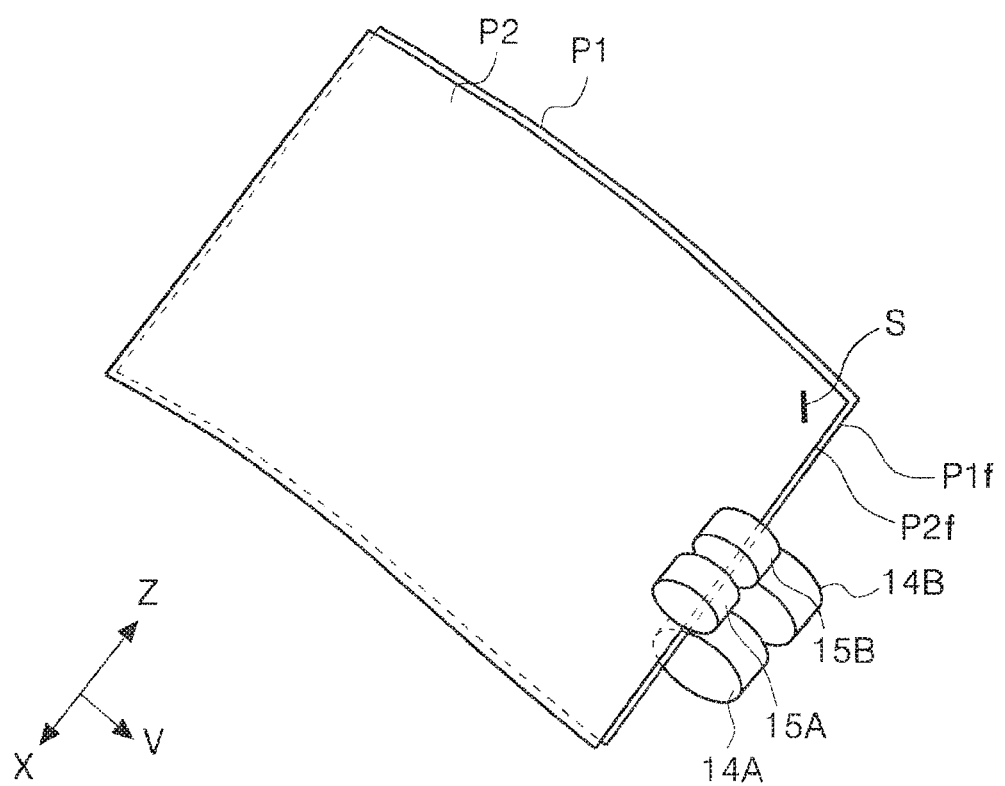
FIG. 6 is a perspective view of feeding of sheets of a document bound with a staple.
Figure 7:
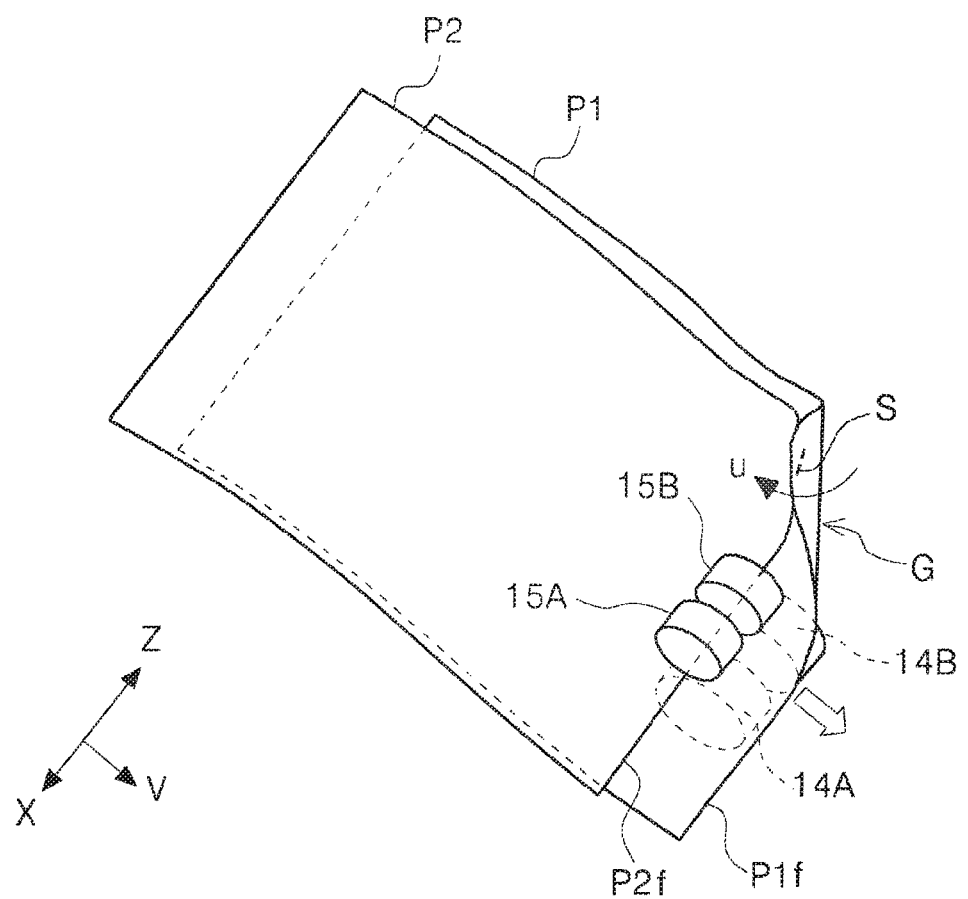
FIG. 7 is a perspective view of feeding of the sheets of the document bound with the staple.
Figure 8:
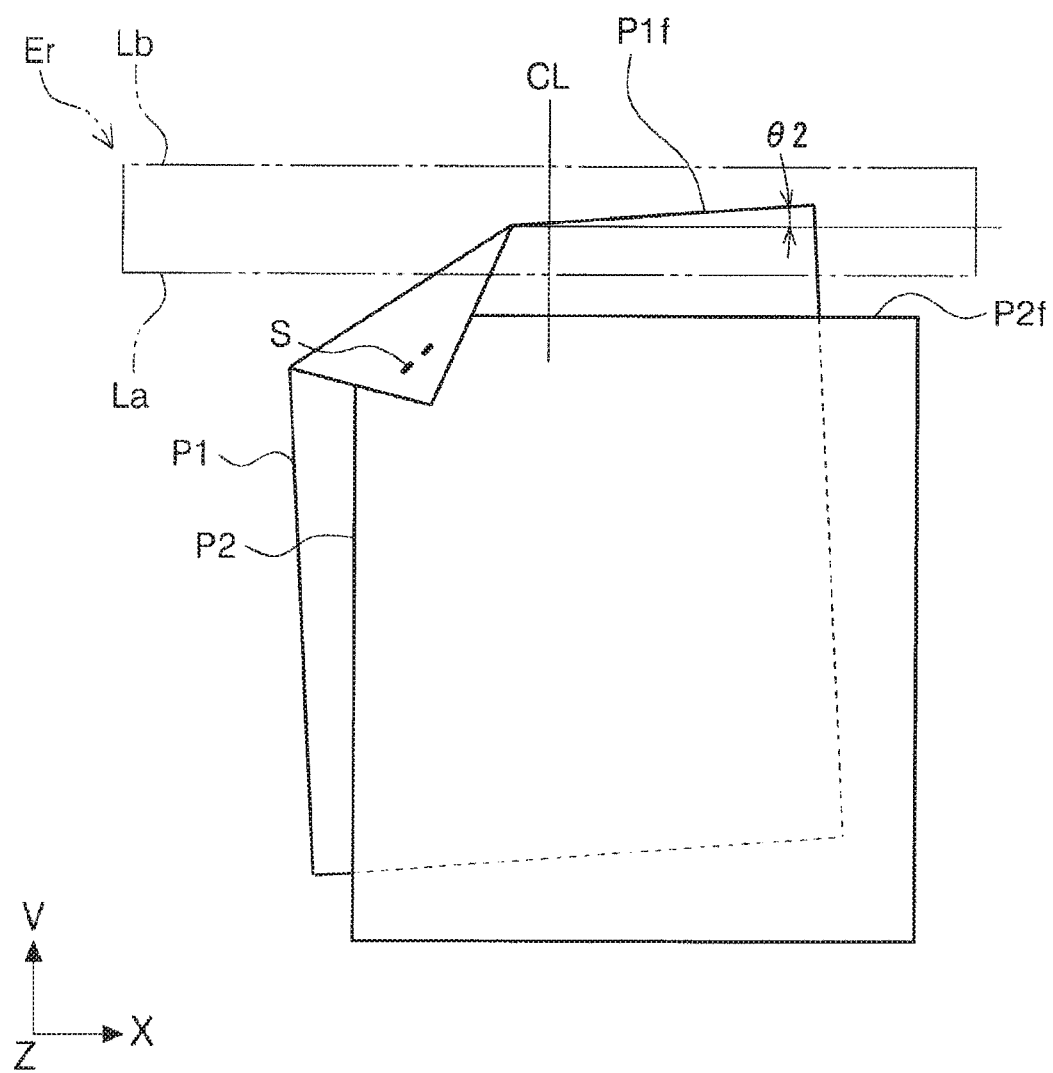
FIG. 8 is a plan view of a document having a bent corner at its leading edge.

In FIG. 6, the sheet P1 and the sheet P2 are bound with a staple S at the −X directional corner downstream in the transportation direction. When the sheet P1 is fed downstream in the transportation direction by the feed roller 14 from this stapled state, the leading edge P1*f* of the sheet P1 only moves downstream while the leading edge P2*f* of the sheet P2 remains stationary on the separation roller 15. Therefore, as illustrated in FIG. 7, the −X directional corner is curled up as indicated by an arrow u, resulting in the occurrence of a bent corner at the leading edge of the document as denoted as G. When the sheet (document) P1 having a bent corner at its leading edge is read, the portion corresponding to the bent corner at the leading edge will be missing in the read image of the leading-edge area and, therefore, as illustrated in FIG. 8, the read image will be biased in the +X direction. In FIG. 8 and the subsequent figures, the area denoted as Er is an abnormality determination area. The controlling unit 40 performs abnormality determination processing for the abnormality determination area. La denotes the upstream edge of the abnormality determination area Er. Lb denotes the downstream edge of the abnormality determination area Er.

Figure 9:
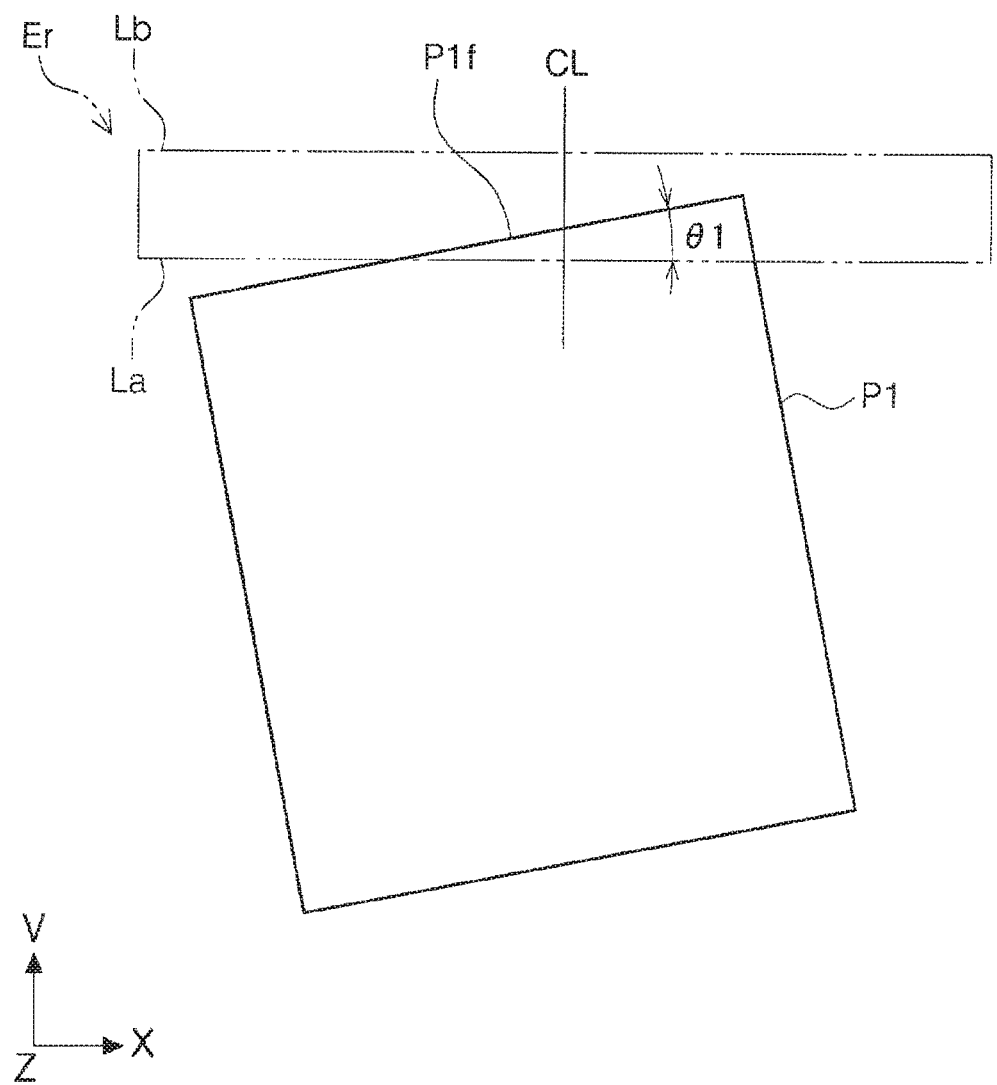
FIG. 9 is a plan view of skew of a document.

As an example to be compared, FIG. 9 depicts a situation of traveling of the sheet P1 with skew, without the occurrence of a bent corner at its leading edge. The angle of inclination of the leading edge P1*f* is denoted as θ1. The angle of inclination θ2 of the leading edge P1*f* of the sheet P1 having the bent corner at the leading edge, which is illustrated in FIG. 8, is sometimes smaller than θ1 of the sheet P1 traveling merely with skew as illustrated in FIG. 9. In the present embodiment, the following approach is taken for distinguishing the state illustrated in FIG. 8 from the state illustrated in FIG. 9.

Figure 10:
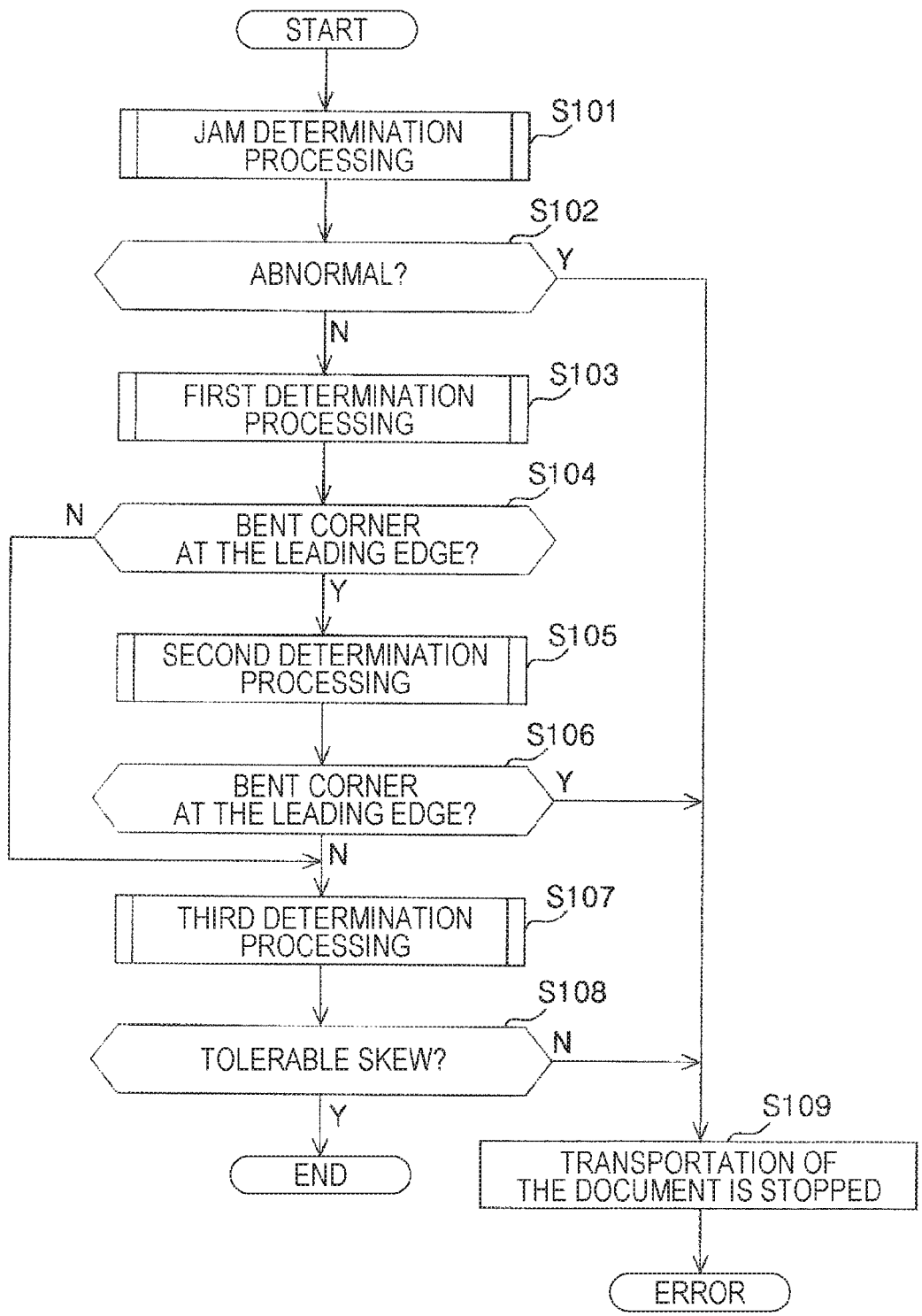
FIG. 10 is a flowchart of abnormality determination processing.
Figure 11:
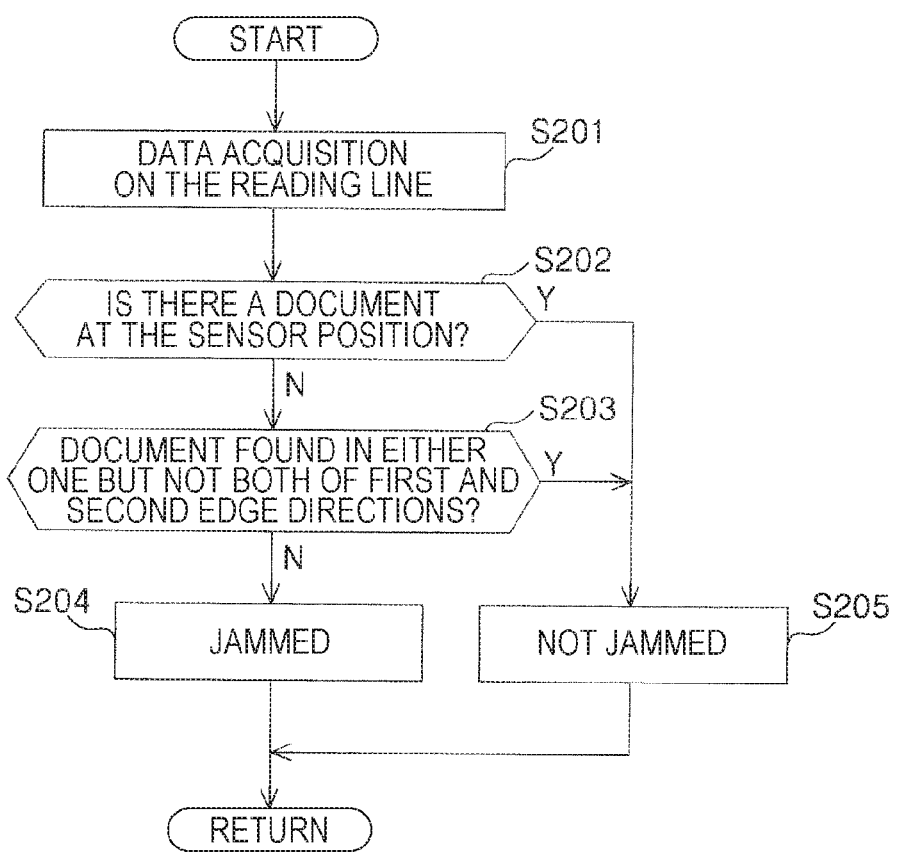
FIG. 11 is a flowchart of jam determination processing.
Figure 15:
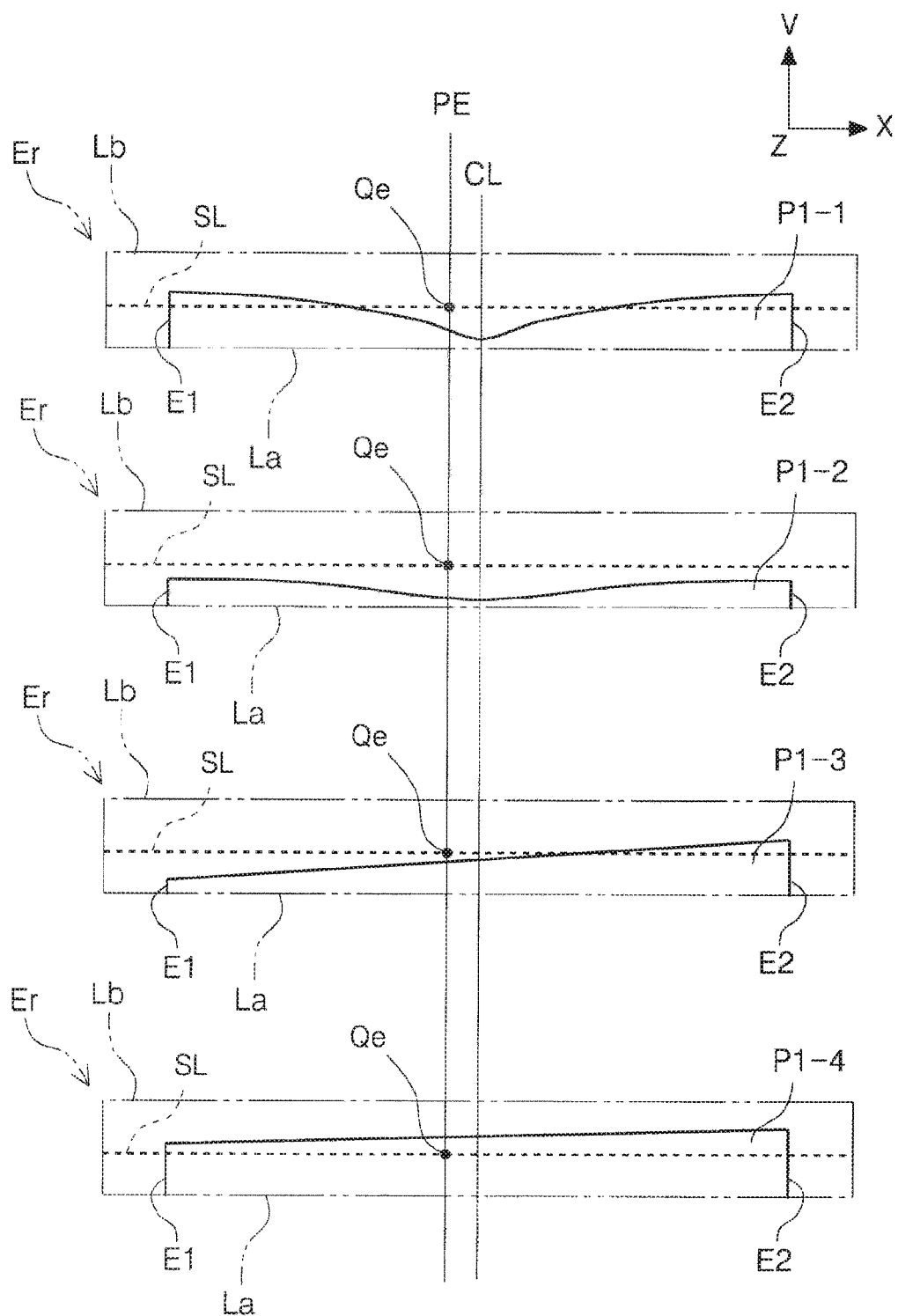
FIG. 15 is a set of diagrams illustrating examples of the leading edge of a document determined in the jam determination processing.

The abnormality determination processing performed by the controlling unit 40 includes jam determination processing (step S101), first determination processing (step S103), second determination processing (step S105), and third determination processing (step S107) illustrated in FIG. 10. In the abnormality determination processing illustrated in FIG. 10, the order of execution may be changed, except that at least the second determination processing (step S105) is performed next after the first determination processing (step S103). For example, the jam determination processing (step S101) may be performed after the second determination processing (step S105) or after the third determination processing (step S107). With reference to FIGS. 11 and 15, the jam determination processing (step S101) will now be explained. In FIG. 15 and the subsequent figures, for convenience of explanation, the abnormality determination area Er only is illustrated without illustrating the sheet in its entirety.

The controlling unit 40 acquires pixel data on a predetermined reading line SL in the abnormality determination area Er (step S201 in FIG. 11). The reading line SL is the line read at the timing of determining that the leading edge of the sheet reaches the reading position, wherein the timing is that the amount of transportation of the sheet corresponds to a sum of a theoretical sheet transportation amount from the detection of the leading edge of the sheet by the second document detection unit 32 (see FIGS. 3 and 5) till the arrival of the leading edge at the reading line SL and a slight extra margin.

The position PE is the position where the second document detection unit 32 is provided in the document width direction. The pixel Qe is the pixel at the position PE on the reading line SL. If data of the pixel Qe indicates the presence of the sheet (S202: Yes in FIG. 11), the controlling unit 40 determines that there is no jam error (step S205 in FIG. 11). The sheet P1-4, which is the fourth one from the top in FIG. 15, is an example of the case described above.

If data of the pixel Qe does not indicate the presence of the sheet (S202: No in FIG. 11), a search is performed in a direction toward a first edge E1 and in a direction toward a second edge E2 to check whether the sheet is present or not. If the sheet is found in either one, but not both, of the direction toward the first edge E1 and the direction toward the second edge E2 (S203: Yes in FIG. 11), the controlling unit 40 determines that there is no jam error (step S205 in FIG. 11). The sheet P1-3, which is the third one from the top in FIG. 15, is an example of the case described above. In this case, the controlling unit 40 determines that the inclination is merely due to skew of the sheet.

If the sheet is found in both of the direction toward the first edge E1 and the direction toward the second edge E2 from the pixel Qe (S203: No in FIG. 11), the controlling unit 40 infers the occurrence of a trouble such as, for example, deformation due to the leading edge getting caught on the second document detection unit 32 as in the sheet P1-1, which is the top one in FIG. 15, and thus determines that there is a jam error (step S204 in FIG. 11). If the sheet is found neither in the direction toward the first edge E1 nor in the direction toward the second edge E2 from the pixel Qe (S203: No in FIG. 11), the controlling unit 40 infers the occurrence of a trouble such as, for example, failing to travel due to the leading edge getting caught on the second document detection unit 32 as in the sheet P1-2, which is the second one from the top in FIG. 15, and thus determines that there is a jam error (step S204 in FIG. 11).

Referring back to FIG. 10, if it is determined in the above jam determination processing that there is a jam error (S102: Yes in FIG. 10), the transportation of the sheet is stopped (step S109). By this means, it is possible to detect the occurrence of a transportation failure properly and prevent the document from being significantly damaged.

Figure 12:
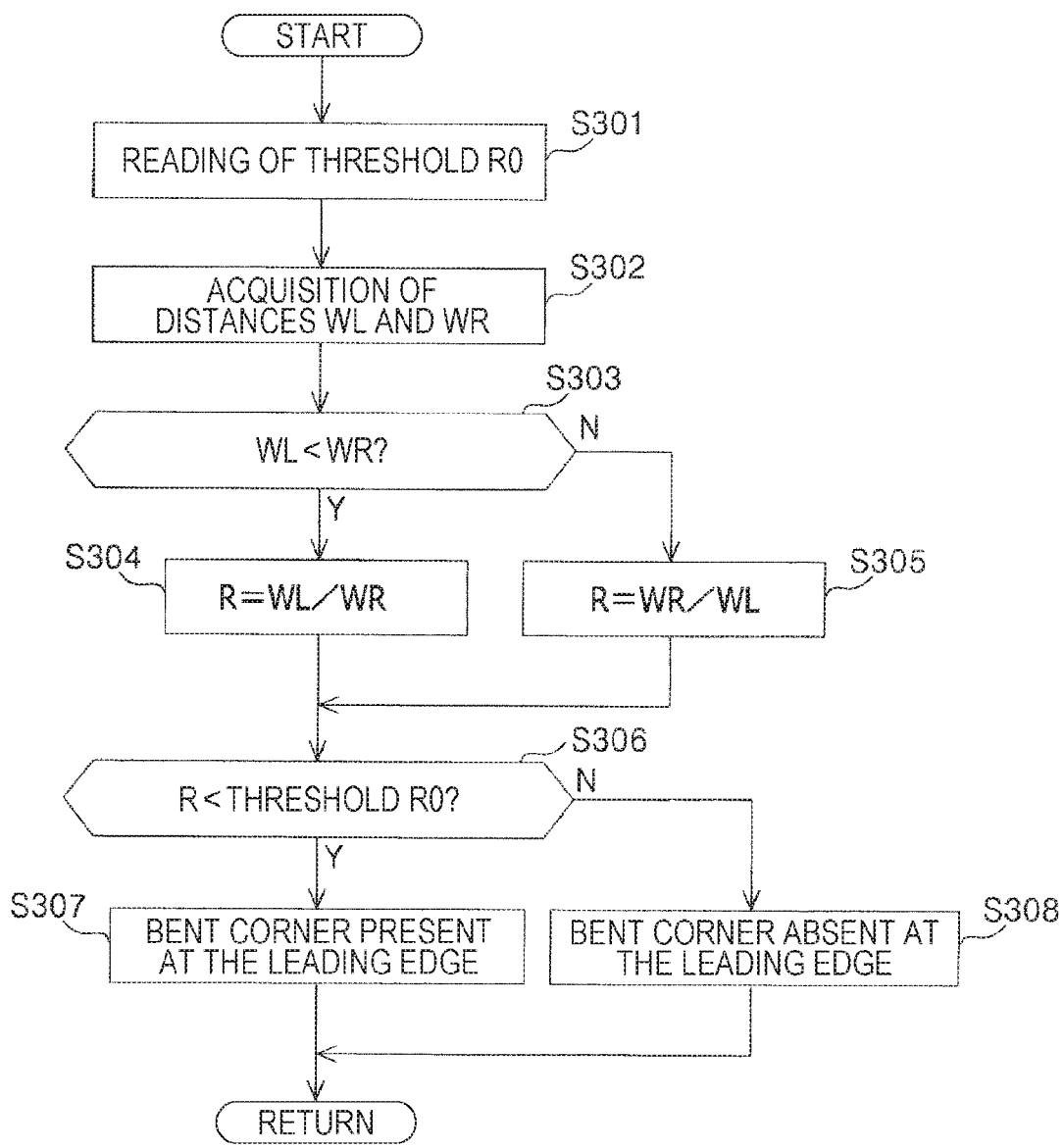
FIG. 12 is a flowchart of first determination processing.
Figure 16:
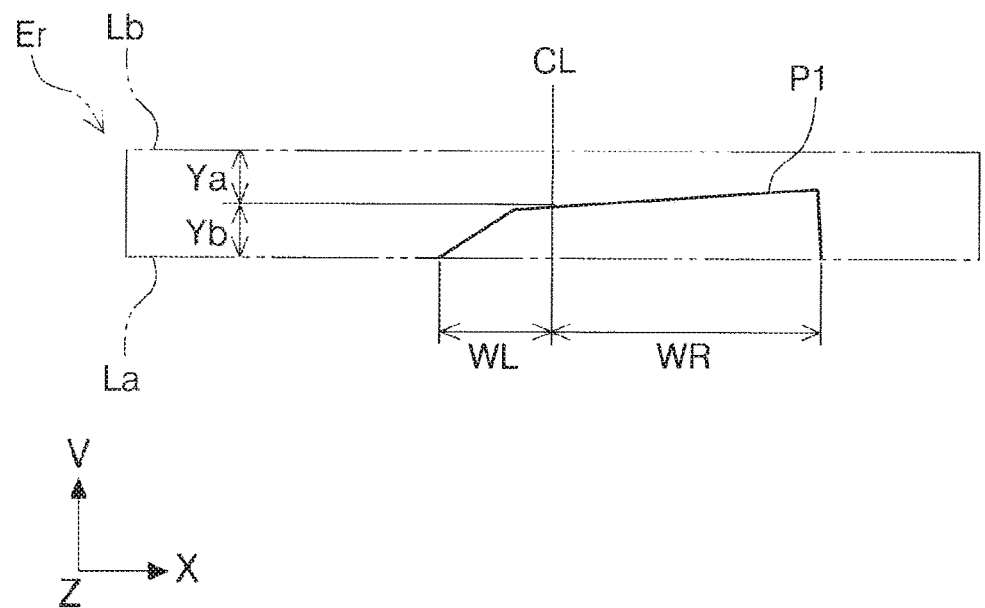
FIG. 16 is a diagram illustrating an example of the leading edge of a document determined in the first determination processing.

Next, the controlling unit 40 performs the first determination processing (step S103). With reference to FIGS. 12 and 16, the first determination processing will now be explained. The controlling unit 40 reads a threshold R0 (step S301 in FIG. 12). Next, based on an image of the abnormality determination area Er, the controlling unit 40 acquires distances WL and WR (step S302 in FIG. 12). The image of the abnormality determination area Er is, for example, an image at the timing of transportation by a theoretical sheet transportation amount from the detection of the leading edge of the sheet by the second document detection unit 32 (see FIGS. 3 and 5) till the arrival of the leading edge at the position that is at a distance Ya from the downstream edge of the abnormality determination area Er. The distance Yb is the distance from the upstream edge of the abnormality determination area Er to the theoretical leading edge position. Setting the distance Yb longer makes it possible to acquire a larger amount of document image data. However, the longer the distance Yb is, the later the timing of abnormality determination will be. Therefore, a shorter distance is advantageous from this point of view. With these things considered, for example, for a A4-sized document, the distance Ya may be set to be approximately 10 mm, and the distance Yb may be set to be 30 mm or shorter.

The distance WL is the distance from the center position CL to one edge in the document width direction at the upstream position of the abnormality determination area Er as illustrated in FIG. 16. The distance WR is the distance from the center position CL to the other edge in the document width direction at the upstream position of the abnormality determination area Er as illustrated in FIG. 16. The terms "one edge" and "the other edge" do not necessarily mean the pair of edges in the width direction of the document as illustrated in FIG. 16. The following case is also encompassed: the edge is detected at the upstream position of the abnormality determination area Er, and either one is the leading edge of the document due to skew or a bent corner at the leading edge of the document.

Next, if the distance WR is longer than the distance WL (S303: Yes in FIG. 12), the controlling unit 40 calculates a value R using an equation R=WL/WR (step S304 in FIG. 12). If the distance WL is longer than the distance WR (S303: No in FIG. 12), the controlling unit 40 calculates the value R using an equation R=WR/WL (step S305 in FIG. 12). The value R is set as R=1 if the distance WR is equal to the distance WL, though not illustrated in FIG. 12. Next, the value R is compared with the threshold R0 (step S306 in FIG. 12). The threshold R0 is a value less than 1. If the value R is less than the threshold R0 (S306: Yes in FIG. 12), it is determined that the document has a bent corner at its leading edge (step S307 in FIG. 12). If the value R is equal to or greater than the threshold R0 (S306: No in FIG. 12), it is determined that the document does not have a bent corner at its leading edge (step S308 in FIG. 12).

As explained earlier with reference to FIG. 8, if feeding of sheets of a document stapled at a downstream corner in the transportation direction is started without removal of the staple before it, a bent corner will be formed at the leading edge of the document. Therefore, in a read image obtained by reading the leading-edge area of the document, the portion corresponding to the bent corner at the leading edge will be missing. Consequently, the position of the read image in the document width direction will be biased either to the left or to the right as illustrated in FIG. 16. By using this nature and comparing the value R, which is the ratio between the distance WL and the distance WR, with the threshold R0, it is possible to detect staple abnormality and thus stop the transportation of the document accordingly, thereby preventing or reducing damage to the document. In the present embodiment, the value R is the ratio between the distance WL and the distance WR, and the value R is less than 1. However, the value R may be greater than 1. If the value R is greater than 1, the threshold R0 is also a value greater than 1, and it is determined that the document has a bent corner at its leading edge if the value R is greater than the threshold R0. The value R may be calculated by subtraction as the difference between the distance WL and the distance WR, instead of the ratio therebetween.

Figure 17:
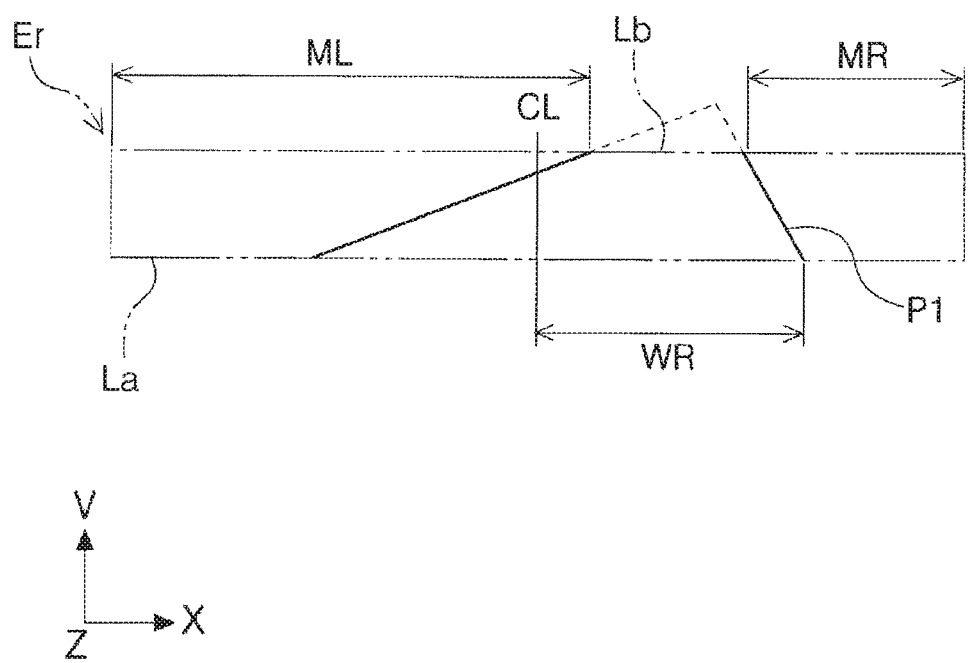
FIG. 17 is a diagram illustrating an example of the leading edge of a document determined in the first determination processing.

In the present embodiment, the distances WL and WR are acquired at the most upstream position in the abnormality determination area Er. However, it could happen that one corner at the leading edge is the first corner ahead of others due to skew as illustrated in FIG. 17, though it is not supposed to be. In anticipation of such a case, distances ML and MR acquired at the most downstream position in the abnormality determination area Er as illustrated in FIG. 17 may be used instead of the distances WL and WR described above.

Figure 18:
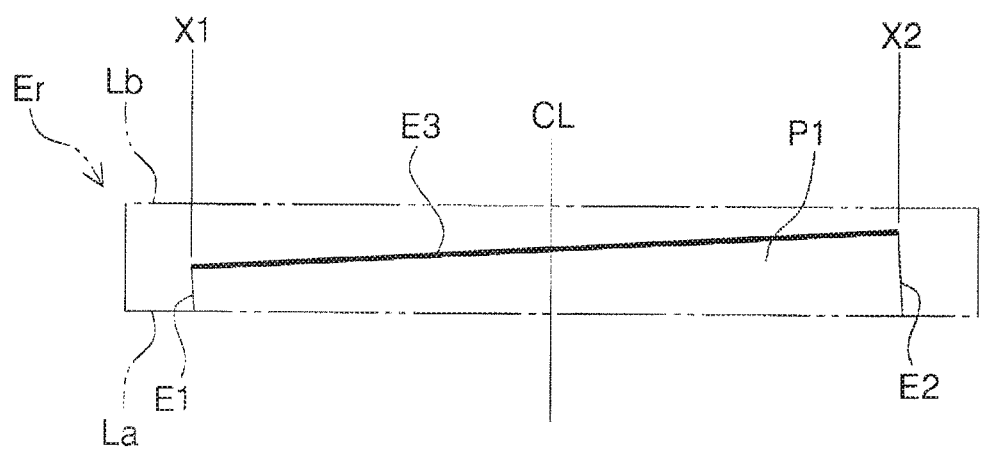
FIG. 18 is a diagram illustrating an example of the leading edge of a document determined in the first determination processing.
Figure 18:
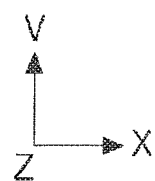

The upper sensor unit 20A and the lower sensor unit 20B apply light from upstream to downstream or from downstream to upstream in the document transportation direction. For this reason, although it is easier to obtain contrast at the upstream edge or the downstream edge in the document transportation direction and thus easier to perform edge extraction thereat, it is sometimes difficult to obtain contrast at the edge in the document width direction and thus difficult to perform edge extraction thereat. This is especially true when the sheet is thin and it is therefore difficult to obtain contrast against the background. Consequently, the distances WL and WR described above might not be acquired accurately. As a solution, the controlling unit 40 may acquire the position of the first edge E1, which is one edge in the document width direction, and the position of the second edge E2, which is the other edge in the document width direction, based on one end position X1 and the other end position X2 in the document width direction of a third edge E3, which is the downstream edge in the document transportation direction, as illustrated in FIG. 18. In this case, the end positions X1 and X2 may be directly used as the position of the first edge E1 and the position of the second edge E2. By doing so, it is possible to acquire the distances WL and WR described above reliably without a significant error.

Referring back to FIG. 10, if it is determined in the first determination processing that the document has a bent corner at its leading edge (S104: Yes), the process proceeds to the second determination processing (step S105). Even if it is determined in the first determination processing that the document has a bent corner at its leading edge, the transportation of the document is not stopped immediately by recognition as staple abnormality. The reason is as follows. The horizontal biasing of a read image in the document width direction occurs not only when the document has a bent corner at its leading edge but also when, for example, as illustrated in FIG. 19, a document having small size is set at a position shifted from the center position CL and is fed.

Figure 13:
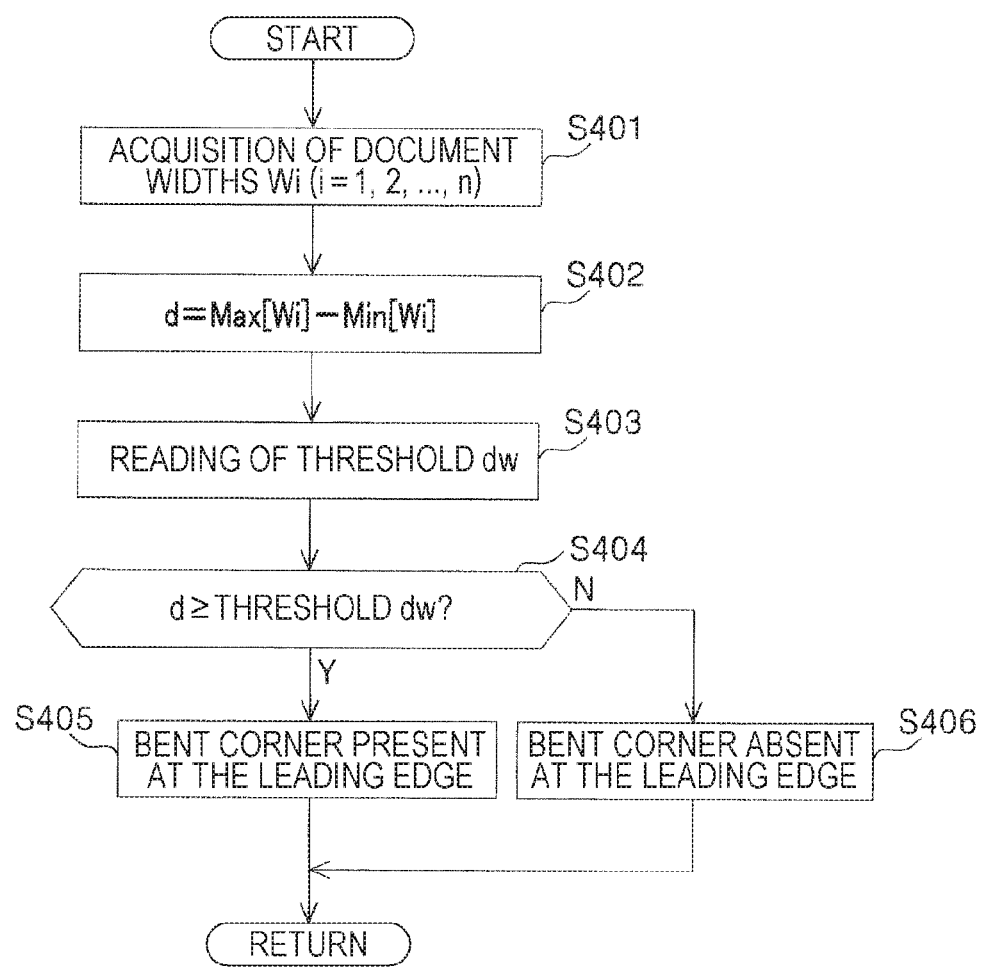
FIG. 13 is a flowchart of second determination processing.
Figure 19:
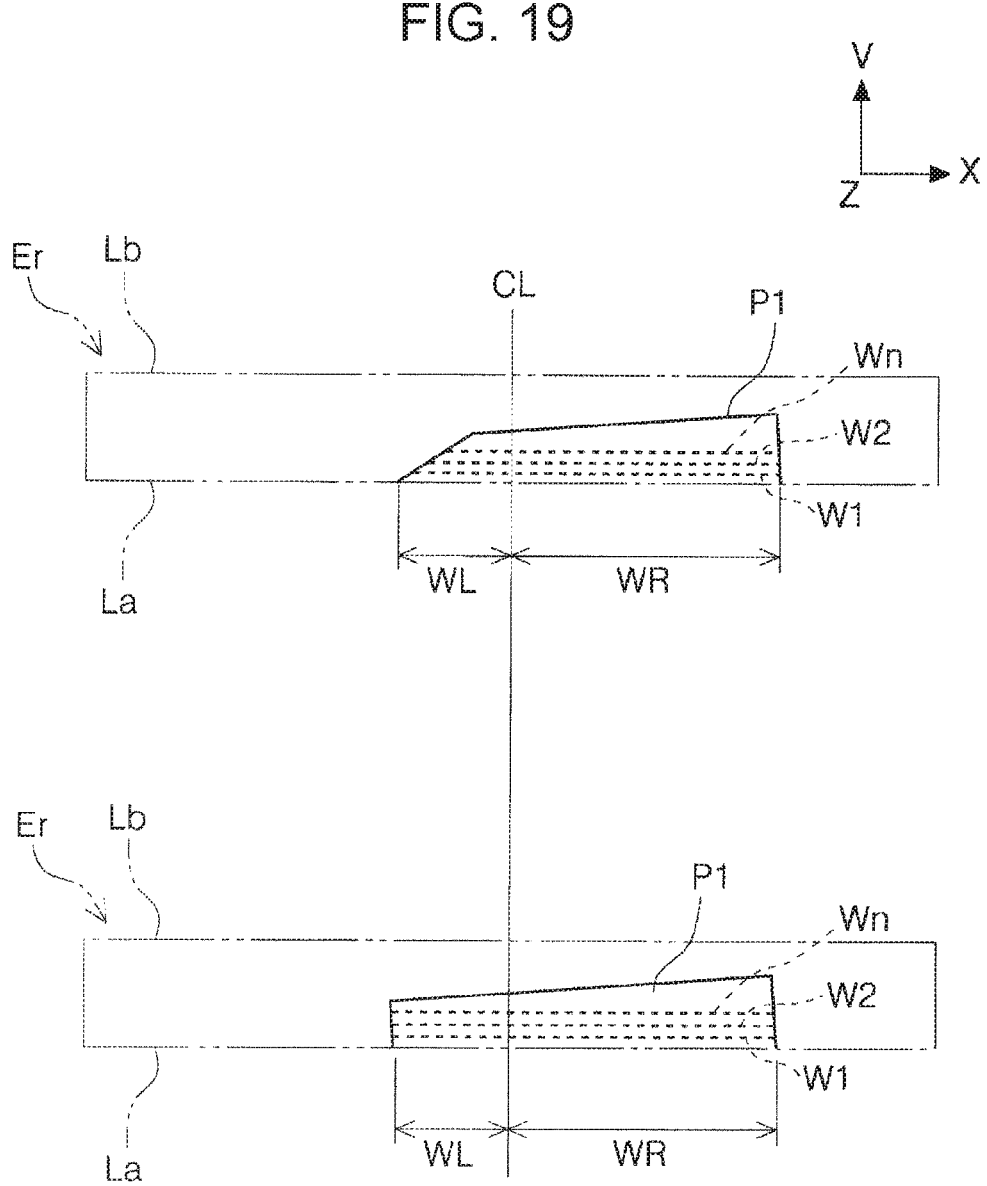
FIG. 19 is a set of diagrams illustrating examples of the leading edge of a document determined in the second determination processing.

In the second determination processing, the above case is distinguished from a case of a bent corner at the leading edge illustrated in the upper part of FIG. 19. First, the controlling unit 40 acquires a plurality of document widths Wi (i=1, 2, . . . , n) (step S401 in FIG. 13). Next, the controlling unit 40 calculates a value d by subtracting the minimum value from the maximum value of the document widths Wi (step S402 in FIG. 13). Next, the controlling unit 40 reads a threshold dw (step S403), compares the value d with the threshold dw (step S404), and determines that the document has a bent corner at its leading edge (step S405) if the value d is equal to or greater than the threshold dw (S404: Yes). The controlling unit 40 determines that the document does not have a bent corner at its leading edge (step S406) if the value d is less than the threshold dw (S404: No). Specifically, if the document has a bent corner at its leading edge as illustrated in the upper part of FIG. 19, the incremental difference among the document widths Wi is greater than when the document does not have a bent corner at its leading edge as illustrated in the lower part of FIG. 19. This nature is used for judging whether the document has a bent corner at its leading edge or not. By this means, it is possible to detect staple abnormality more accurately.

As described earlier, the scanner 1 according to the present embodiment is provided with a pair of edge guides 12A and 12B (see FIG. 5). Due to a function of a non-illustrated rack pinion mechanism, the pair of edge guides 12A and 12B is always configured to be at symmetric positions with respect to the center position CL in the document width direction. Therefore, the case illustrated in the lower part of FIG. 19 rarely happens. Therefore, the second determination processing described above may be omitted. When omitted, the transportation of the document may be stopped immediately if it is determined in the first determination processing that the document has a bent corner at its leading edge.

Referring back to FIG. 10, since the second determination processing makes it possible to determine with greater accuracy whether the document has a bent corner at its leading edge or not, the transportation of the document is stopped (step S109) if it is determined in the second determination processing that the document has a bent corner at its leading edge (S106: Yes). By this means, it is possible to detect the occurrence of a transportation failure properly and prevent the document from being significantly damaged.

Figure 14:
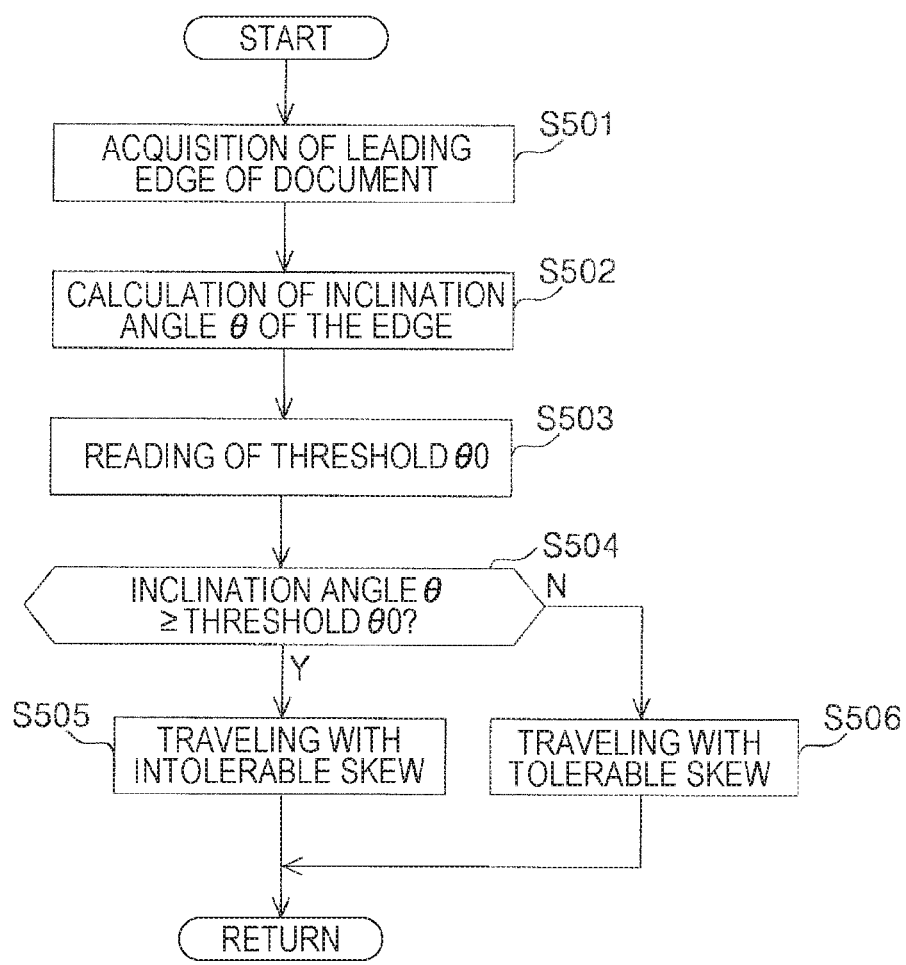
FIG. 14 is a flowchart of third determination processing.

If it is not determined in the second determination processing that the document has a bent corner at its leading edge (S106: No), the controlling unit 40 performs the third determination processing (step S107). In the third determination processing, as illustrated in FIG. 14, the controlling unit 40 acquires the leading edge of the document (step S501) first. Next, the controlling unit 40 calculates the inclination angle θ of the edge (step S502), reads a threshold θ0 (step S503), compares the inclination angle θ with the threshold θ0, determines that the document is traveling with skew that is not within a tolerable range (step S505) if the inclination angle θ is equal to or greater than the threshold θ0 (S504: Yes), and determines that the document is traveling with skew that is within the tolerable range (step S506) if the inclination angle θ is less than the threshold θ0 (S504: No). Referring back to FIG. 10, if the skew is not within the tolerable range (S108: No), the transportation of the document is stopped (step S109). By this means, it is possible to detect the occurrence of a transportation failure properly and prevent the document from being significantly damaged.

The scope of the present disclosure is not limited to the foregoing embodiments. The present disclosure can be modified in various ways within the scope of the recitation of appended claims. Needless to say, such modifications are within the scope of the present disclosure. In the present embodiment, the center position CL in the document width direction is the baseline position for feeding a document, and the center position CL does not vary no matter which size the document may have. However, depending on cases, for example, the baseline position for feeding a document could be taken at the position of one edge in the document width direction. In that case, the center position CL in the document width direction varies depending on the size of the document. As will be seen, the center position CL means the theoretical center of a document, no matter where the baseline position for feeding the document is taken.

What is claimed is:

1. An image reading apparatus, comprising:
a medium transportation path along which a medium is transported;
a read unit that reads the medium and is provided on the medium transportation path; and
a control unit that processes read data read by the read unit and controls transportation of the medium along the medium transportation path; wherein
the control unit sets an abnormality determination area for a leading-edge area of the medium and performs abnormality determination processing for the abnormality determination area,
the abnormality determination processing includes first determination processing; and
the first determination processing includes
acquiring, at an upstream position in a medium transportation direction of the abnormality determination area, a distance WL from a center position in a medium width direction intersecting with the medium transportation direction to one edge in the medium width direction and a distance WR from the center position to the other edge in the medium width direction, and
comparing a value R that is a ratio between the distance WL and the distance WR or a difference therebetween with a threshold R0 determined in advance.

2. The image reading apparatus according to claim 1, wherein
in the first determination processing, the control unit calculates the value R using an equation R=WL/WR when the distance WR is longer than the distance WL, calculates the value R using an equation R=WR/WL when the distance WL is longer than the distance WR, and sets the value R as R=1 when the distance WR is equal to the distance WL, and
the control unit compares the value R with the threshold R0 that is less than 1, and determines as abnormality and performs predetermined processing when the value R is less than the threshold R0.

3. The image reading apparatus according to claim 2, wherein
the abnormality determination processing includes second determination processing that is performed as the predetermined processing when the value R is less than the threshold R0 in the first determination processing,
the second determination processing includes
acquiring, along the medium transportation direction, a plurality of document widths in the medium width direction in the abnormality determination area,
acquiring a value d that is a difference between a maximum value and a minimum value of the plurality of document widths acquired, and
comparing the value d with a threshold dw determined in advance, and
the control unit stops the transportation of the medium when the value d is equal to or greater than the threshold dw.

4. The image reading apparatus according to claim 3, wherein
the abnormality determination processing includes third determination processing that is performed when the value d is less than the threshold dw in the second determination processing,
the third determination processing includes
acquiring an inclination angle θ of a leading edge of the medium in the abnormality determination area, and
comparing the inclination angle θ with a threshold θ0 determined in advance, and
the control unit stops the transportation of the medium when the inclination angle θ is equal to or greater than the threshold θ0.

5. The image reading apparatus according to claim 1, wherein
the control unit acquires a position of a first edge that is one edge in the medium width direction and a position of a second edge that is the other edge in the medium width direction, based on one end position and the other end position in the medium width direction of a third edge that is a downstream edge in the medium transportation direction.

6. The image reading apparatus according to claim 1, further comprising:
a sensor provided upstream of the read unit on the medium transportation path, the sensor being configured to be in contact with a leading edge of the medium and detect passing of the leading edge; wherein
the abnormality determination processing includes jam determination processing for determining whether the medium is deformed or not,
in the jam determination processing, on a reading line at timing of determining that the leading edge of the medium reaches a reading position by the read unit, when the medium is determined to be absent at a position where the sensor is provided in the medium width direction, a search is performed in one direction and the other direction of the medium width direction to check whether the medium is present or not, and
the transportation of the medium is stopped when the medium is found in both of the one direction and the other direction of the medium width direction or when the medium is found neither in the one direction nor in the other direction of the medium width direction.

7. A non-transitory computer-readable storage medium storing an abnormality determination program to be run on an image reading apparatus, the image reading apparatus including a medium transportation path along which a medium is transported, a read unit that reads the medium and is provided on the medium transportation path, and a control unit that processes read data read by the read unit and controls transportation of the medium along the medium transportation path, the abnormality determination program comprising:
first determination processing of setting an abnormality determination area for a leading-edge area of the medium and performing abnormality determination for the abnormality determination area; wherein
the first determination processing includes
acquiring, at an upstream position in a medium transportation direction of the abnormality determination area, a distance WL from a center position in a medium width direction intersecting with the medium transportation direction to one edge in the medium width direction and a distance WR from the center position to the other edge in the medium width direction, and
comparing a value R that is a ratio between the distance WL and the distance WR or a difference therebetween with a threshold R0 determined in advance.

8. An abnormality determination method implemented in an image reading apparatus, the image reading apparatus including a medium transportation path along which a medium is transported, a read unit that reads the medium and is provided on the medium transportation path, and a control unit that processes read data read by the read unit and controls transportation of the medium along the medium transportation path, the abnormality determination method comprising:

acquiring, at an upstream position in a medium transportation direction of an abnormality determination area set for a leading-edge area of the medium, a distance WL from a center position in a medium width direction intersecting with the medium transportation direction to one edge in the medium width direction and a distance WR from the center position to the other edge in the medium width direction; and comparing a value R that is a ratio between the distance WL and the distance WR or a difference therebetween with a threshold R0 determined in advance.

* * * * *